US012286540B2

(12) United States Patent
Hardman et al.

(10) Patent No.: US 12,286,540 B2
(45) Date of Patent: Apr. 29, 2025

(54) CARBON BLACK GENERATING SYSTEM

(71) Applicant: MONOLITH MATERIALS, INC., Lincoln, NE (US)

(72) Inventors: Ned J. Hardman, Lincoln, NE (US); Roscoe W. Taylor, Kingwood, TX (US); Robert J. Hanson, Lincoln, NE (US); Peter L. Johnson, Mountain View, CA (US)

(73) Assignee: Monolith Materials, Inc., Lincoln, NE (US)

( * ) Notice: Subject to any disclaimer, the term of this patent is extended or adjusted under 35 U.S.C. 154(b) by 0 days.

(21) Appl. No.: 18/638,484

(22) Filed: Apr. 17, 2024

(65) Prior Publication Data

US 2024/0343910 A1 Oct. 17, 2024

Related U.S. Application Data

(63) Continuation of application No. 15/548,346, filed as application No. PCT/US2016/015941 on Feb. 1, 2016, now Pat. No. 11,987,712.

(60) Provisional application No. 62/111,346, filed on Feb. 3, 2015.

(51) Int. Cl.
*C09C 1/48* (2006.01)
*B01J 19/08* (2006.01)

(52) U.S. Cl.
CPC ............. *C09C 1/485* (2013.01); *B01J 19/088* (2013.01); *B01J 2219/0809* (2013.01); *B01J 2219/0869* (2013.01); *B01J 2219/0871* (2013.01); *B01J 2219/0875* (2013.01); *B01J 2219/0898* (2013.01); *C01P 2006/12* (2013.01); *C01P 2006/19* (2013.01)

(58) Field of Classification Search
CPC ................................ C09C 1/485; B01J 19/088
See application file for complete search history.

(56) References Cited

U.S. PATENT DOCUMENTS

| | | | |
|---|---|---|---|
| 709,868 A | 9/1902 | Bradley et al. | |
| 1,339,225 A | 5/1920 | Rose | |
| 1,536,612 A | 5/1925 | Lewis | |
| 1,597,277 A | 8/1926 | Jakowsky | |
| 1,931,800 A | 10/1933 | Jakosky et al. | |
| 2,002,003 A | 5/1935 | Otto et al. | |
| 2,039,312 A | 5/1936 | Goldman | |
| 2,062,358 A | 12/1936 | Frolich | |
| 2,393,106 A | 1/1946 | Bernard et al. | |
| 2,557,143 A | 6/1951 | Royster | |
| 2,572,851 A | 10/1951 | Daniel et al. | |
| 2,603,669 A | 7/1952 | Chappell | |
| 2,603,699 A | 7/1952 | Roper | |
| 2,616,842 A | 11/1952 | Charles et al. | |
| 2,785,964 A | 3/1957 | Pollock | |
| 2,850,403 A | 9/1958 | Day | |
| 2,851,403 A | 9/1958 | Hale | |
| 2,897,071 A | 7/1959 | Gilbert | |
| 2,897,869 A | 8/1959 | Polmanteer | |
| 2,951,143 A | 8/1960 | Anderson et al. | |
| 3,009,783 A | 11/1961 | Charles et al. | |
| 3,073,769 A | 1/1963 | George et al. | |
| 3,127,536 A | 3/1964 | McLane | |
| 3,253,890 A | 5/1966 | De et al. | |
| 3,288,696 A | 11/1966 | Orbach | |
| 3,307,923 A | 3/1967 | Ruble | |
| 3,308,164 A | 3/1967 | Shepard | |
| 3,309,780 A | 3/1967 | Goins | |
| 3,331,664 A | 7/1967 | Jordan | |
| 3,342,554 A | 9/1967 | Jordan et al. | |
| 3,344,051 A * | 9/1967 | Latham, Jr. ............... | C09C 1/50 422/906 |
| 3,408,164 A | 10/1968 | Johnson | |
| 3,409,403 A | 11/1968 | Geir et al. | |
| 3,420,632 A | 1/1969 | Ryan et al. | |
| 3,431,074 A | 3/1969 | Jordan et al. | |

(Continued)

FOREIGN PATENT DOCUMENTS

| | | | |
|---|---|---|---|
| AU | 2897071 A | 11/1972 | |
| BG | 98848 A | 5/1995 | |

(Continued)

OTHER PUBLICATIONS

AP-42, Fifth Edition, vol. 1, Chapter 6: Organic Chemical Process Industry, Section 6.1: Carbon Black (1983): 1-10.

ASTM International Designation: D6556-14. Standard Test Method for Carbon Black—Total and External Surface Area by Nitrogen Adsorption1, 2014. 5 Pages.

ASTM International: Standard Test Method for Carbon Black—Morphological Characterization of Carbon Black Using Electron Microscopy, D3849-07 (2011); 7 Pages.

Ayala, et al., Carbon Black Elastomer Interaction. Rubber Chemistry and Technology (1991): 19-39.

Bakken, et al., Thermal plasma process development in Norway. Pure and Applied Chemistry 70.6 (1998): 1223-1228.

(Continued)

*Primary Examiner* — Stuart L Hendrickson

(74) *Attorney, Agent, or Firm* — Wilson Sonsini Goodrich & Rosati

(57) ABSTRACT

Apparatus and process for the continuous production of carbon black or carbon containing compounds. The process is performed by converting a carbon containing feedstock, including generating a plasma gas with electrical energy, accelerating the plasma gas through a nozzle, whose diameter is narrowing in the direction of the plasma gas, guiding the plasma gas into a reaction area where feedstock is injected under conditions generated by aerodynamic and electromagnetic forces, including intense rapid mixing between the plasma gas and feedstock occurs. There is no significant recirculation of feedstock into the plasma chamber, and the reaction zone does not immediately come into contact with any contact surfaces. The products of reaction are cooled, and the carbon black or carbon containing compounds are separated from the other reaction products.

18 Claims, 2 Drawing Sheets

(56) References Cited

U.S. PATENT DOCUMENTS

| | | | |
|---|---|---|---|
| 3,453,488 | A | 7/1969 | Cann et al. |
| 3,464,793 | A | 9/1969 | Jordan et al. |
| 3,619,138 | A | 11/1971 | Gunnell |
| 3,619,140 | A | 11/1971 | Morgan et al. |
| 3,637,974 | A | 1/1972 | Tajbl et al. |
| 3,673,375 | A | 6/1972 | Camacho et al. |
| 3,725,103 | A | 4/1973 | Jordan et al. |
| 3,793,438 | A | 2/1974 | Gunnell et al. |
| 3,852,399 | A | 12/1974 | Rothbuhr et al. |
| 3,922,335 | A | 11/1975 | Jordan et al. |
| 3,959,008 | A | 5/1976 | Warner et al. |
| 3,981,654 | A | 9/1976 | Rood et al. |
| 3,981,659 | A | 9/1976 | Myers |
| 3,984,743 | A | 10/1976 | Horie |
| 3,998,934 | A | 12/1976 | Vanderveen |
| 4,019,896 | A | 4/1977 | Appleby |
| 4,028,072 | A | 6/1977 | Braun et al. |
| 4,035,336 | A | 7/1977 | Jordan et al. |
| 4,057,396 | A | 11/1977 | Matovich |
| 4,075,160 | A | 2/1978 | Mills et al. |
| 4,088,741 | A | 5/1978 | Takewell |
| 4,101,639 | A | 7/1978 | Surovikin et al. |
| 4,138,471 | A | 2/1979 | Lamond et al. |
| 4,199,545 | A | 4/1980 | Matovich |
| 4,217,132 | A | 8/1980 | Burge et al. |
| 4,258,770 | A | 3/1981 | Davis et al. |
| 4,282,199 | A | 8/1981 | Lamond et al. |
| 4,289,949 | A | 9/1981 | Raaness et al. |
| 4,292,291 | A | 9/1981 | Rothbuhr et al. |
| 4,317,001 | A | 2/1982 | Silver et al. |
| 4,372,937 | A | 2/1983 | Johnson |
| 4,404,178 | A | 9/1983 | Johnson et al. |
| 4,431,624 | A | 2/1984 | Casperson |
| 4,452,771 | A | 6/1984 | Hunt |
| 4,460,558 | A | 7/1984 | Johnson |
| 4,472,172 | A | 9/1984 | Sheer et al. |
| 4,543,470 | A | 9/1985 | Santen et al. |
| 4,553,981 | A | 11/1985 | Fuderer |
| 4,577,461 | A | 3/1986 | Cann |
| 4,594,381 | A | 6/1986 | Davis |
| 4,597,776 | A | 7/1986 | Ullman et al. |
| 4,601,887 | A | 7/1986 | Dorn et al. |
| 4,678,888 | A | 7/1987 | Camacho et al. |
| 4,689,199 | A | 8/1987 | Eckert et al. |
| 4,755,371 | A | 7/1988 | Dickerson |
| 4,765,964 | A | 8/1988 | Gravley et al. |
| 4,766,287 | A | 8/1988 | Morrisroe et al. |
| 4,787,320 | A | 11/1988 | Raaness et al. |
| 4,797,262 | A | 1/1989 | Dewitz |
| 4,864,096 | A | 9/1989 | Wolf et al. |
| 4,977,305 | A | 12/1990 | Severance, Jr. |
| 5,039,312 | A | 8/1991 | Hollis, Jr. et al. |
| 5,045,667 | A | 9/1991 | Iceland et al. |
| 5,046,145 | A | 9/1991 | Drouet |
| 5,105,123 | A | 4/1992 | Ballou |
| 5,126,501 | A | 6/1992 | Ellul |
| 5,138,959 | A | 8/1992 | Kulkarni |
| 5,147,998 | A | 9/1992 | Tsantrizos et al. |
| 5,159,009 | A | 10/1992 | Wolff et al. |
| 5,206,880 | A | 4/1993 | Olsson |
| 5,222,448 | A | 6/1993 | Morgenthaler et al. |
| 5,352,289 | A | 10/1994 | Weaver et al. |
| 5,399,957 | A | 3/1995 | Vierboom |
| 5,427,762 | A | 6/1995 | Steinberg et al. |
| 5,476,826 | A | 12/1995 | Greenwald et al. |
| 5,481,080 | A | 1/1996 | Lynum et al. |
| 5,486,674 | A | 1/1996 | Lynum et al. |
| 5,500,501 | A | 3/1996 | Lynum et al. |
| 5,527,518 | A | 6/1996 | Lynum et al. |
| 5,578,647 | A | 11/1996 | Li et al. |
| 5,593,644 | A | 1/1997 | Norman et al. |
| 5,602,298 | A | 2/1997 | Levin |
| 5,604,424 | A | 2/1997 | Shuttleworth |
| 5,611,947 | A | 3/1997 | Vavruska |
| 5,673,285 | A | 9/1997 | Wittle et al. |
| 5,717,293 | A | 2/1998 | Sellers |
| 5,725,616 | A | 3/1998 | Lynum et al. |
| 5,749,937 | A | 5/1998 | Detering et al. |
| 5,935,293 | A | 8/1999 | Detering et al. |
| 5,951,960 | A | 9/1999 | Lynum et al. |
| 5,989,512 | A | 11/1999 | Lynum et al. |
| 5,997,837 | A | 12/1999 | Lynum et al. |
| 6,042,643 | A | 3/2000 | Belmont et al. |
| 6,058,133 | A | 5/2000 | Bowman et al. |
| 6,068,827 | A | 5/2000 | Lynum et al. |
| 6,090,880 | A | 7/2000 | Zimmer et al. |
| 6,099,696 | A | 8/2000 | Schwob et al. |
| 6,188,187 | B1 | 2/2001 | Harlan |
| 6,197,274 | B1 | 3/2001 | Mahmud et al. |
| 6,277,350 | B1 | 8/2001 | Gerspacher |
| 6,358,375 | B1 | 3/2002 | Schwob |
| 6,380,507 | B1 | 4/2002 | Childs |
| 6,395,197 | B1 | 5/2002 | Detering et al. |
| 6,403,697 | B1 | 6/2002 | Mitsunaga et al. |
| 6,441,084 | B1 | 8/2002 | Lee et al. |
| 6,442,950 | B1 | 9/2002 | Tung |
| 6,444,727 | B1 | 9/2002 | Yamada et al. |
| 6,471,937 | B1 | 10/2002 | Anderson et al. |
| 6,602,920 | B2 | 8/2003 | Hall et al. |
| 6,703,580 | B2 | 3/2004 | Brunet et al. |
| 6,773,689 | B1 | 8/2004 | Lynum et al. |
| 6,955,707 | B2 | 10/2005 | Ezell et al. |
| 7,167,240 | B2 | 1/2007 | Stagg |
| 7,294,314 | B2 | 11/2007 | Graham |
| 7,312,415 | B2 | 12/2007 | Ohmi et al. |
| 7,360,309 | B2 | 4/2008 | Vaidyanathan et al. |
| 7,431,909 | B1 | 10/2008 | Rumpf et al. |
| 7,452,514 | B2 * | 11/2008 | Fabry .................. C01B 3/26 204/173 |
| 7,462,343 | B2 | 12/2008 | Lynum et al. |
| 7,485,280 | B2 | 2/2009 | Matsuki et al. |
| 7,563,525 | B2 | 7/2009 | Ennis |
| 7,576,296 | B2 * | 8/2009 | Fincke .................. C01B 3/24 219/121.36 |
| 7,582,184 | B2 | 9/2009 | Tomita et al. |
| 7,623,340 | B1 | 11/2009 | Song et al. |
| 7,635,824 | B2 | 12/2009 | Miki et al. |
| 7,655,209 | B2 | 2/2010 | Rumpf et al. |
| 7,777,151 | B2 | 8/2010 | Kuo |
| 7,847,009 | B2 | 12/2010 | Wong et al. |
| 7,931,712 | B2 | 4/2011 | Zubrin et al. |
| 7,968,191 | B2 | 6/2011 | Hampden-Smith et al. |
| 8,147,765 | B2 | 4/2012 | Muradov et al. |
| 8,221,689 | B2 | 7/2012 | Boutot et al. |
| 8,257,452 | B2 | 9/2012 | Menzel |
| 8,277,739 | B2 | 10/2012 | Monsen et al. |
| 8,323,793 | B2 | 12/2012 | Hamby et al. |
| 8,443,741 | B2 | 5/2013 | Chapman et al. |
| 8,471,170 | B2 | 6/2013 | Li et al. |
| 8,475,551 | B2 | 7/2013 | Tsangaris et al. |
| 8,486,364 | B2 | 7/2013 | Vanier et al. |
| 8,501,148 | B2 | 8/2013 | Belmont et al. |
| 8,581,147 | B2 | 11/2013 | Kooken et al. |
| 8,710,136 | B2 | 4/2014 | Yurovskaya et al. |
| 8,771,386 | B2 | 7/2014 | Licht et al. |
| 8,784,617 | B2 | 7/2014 | Novoselov et al. |
| 8,850,826 | B2 | 10/2014 | Ennis |
| 8,871,173 | B2 | 10/2014 | Nester et al. |
| 8,911,596 | B2 | 12/2014 | Vancina |
| 8,945,434 | B2 | 2/2015 | Krause et al. |
| 9,023,928 | B2 | 5/2015 | Miyazaki et al. |
| 9,095,835 | B2 | 8/2015 | Skoptsov et al. |
| 9,229,396 | B1 | 1/2016 | Wu et al. |
| 9,315,735 | B2 | 4/2016 | Cole et al. |
| 9,388,300 | B2 | 7/2016 | Dikan et al. |
| 9,445,488 | B2 | 9/2016 | Foret |
| 9,574,086 | B2 | 2/2017 | Johnson et al. |
| 9,679,750 | B2 | 6/2017 | Choi et al. |
| 9,812,295 | B1 * | 11/2017 | Stowell .................. H01J 37/3244 |
| 10,100,200 | B2 | 10/2018 | Johnson et al. |
| 10,138,378 | B2 | 11/2018 | Hoermman et al. |
| 10,370,539 | B2 | 8/2019 | Johnson et al. |
| 10,519,299 | B2 | 12/2019 | Sevignon et al. |
| 10,618,026 | B2 | 4/2020 | Taylor et al. |

(56) References Cited

U.S. PATENT DOCUMENTS

| | | |
|---|---|---|
| 10,808,097 B2 | 10/2020 | Hardman et al. |
| 11,149,148 B2 | 10/2021 | Taylor et al. |
| 11,203,692 B2 * | 12/2021 | Hoermann ................ C09C 1/48 |
| 11,263,217 B2 | 3/2022 | Zimovnov et al. |
| 11,304,288 B2 | 4/2022 | Hoermann et al. |
| 11,453,784 B2 | 9/2022 | Hardman et al. |
| 11,492,496 B2 | 11/2022 | Hoermann et al. |
| 11,591,477 B2 | 2/2023 | Johnson et al. |
| 11,665,808 B2 | 5/2023 | Moss et al. |
| 11,760,884 B2 | 9/2023 | Hardman et al. |
| 11,866,589 B2 | 1/2024 | Johnson et al. |
| 11,926,743 B2 | 3/2024 | Johnson et al. |
| 11,939,477 B2 | 3/2024 | Johnson et al. |
| 11,987,712 B2 | 5/2024 | Hardman et al. |
| 11,998,886 B2 | 6/2024 | Taylor et al. |
| 12,012,515 B2 | 6/2024 | Hoermann et al. |
| 12,030,776 B2 | 7/2024 | Hardman |
| 12,119,133 B2 | 10/2024 | Hardman et al. |
| 12,144,099 B2 | 11/2024 | Hoermann et al. |
| 2001/0029888 A1 | 10/2001 | Sundarrajan et al. |
| 2001/0039797 A1 | 11/2001 | Cheng |
| 2002/0000085 A1 | 1/2002 | Hall et al. |
| 2002/0021430 A1 | 2/2002 | Koshelev et al. |
| 2002/0050323 A1 | 5/2002 | Moisan et al. |
| 2002/0051903 A1 | 5/2002 | Masuko et al. |
| 2002/0141476 A1 | 10/2002 | Varela |
| 2002/0157559 A1 | 10/2002 | Brunet et al. |
| 2003/0103858 A1 | 6/2003 | Baran et al. |
| 2003/0136661 A1 | 7/2003 | Kong et al. |
| 2003/0152184 A1 | 8/2003 | Shehane et al. |
| 2004/0001626 A1 | 1/2004 | Baudry et al. |
| 2004/0045808 A1 | 3/2004 | Fabry et al. |
| 2004/0047779 A1 | 3/2004 | Denison |
| 2004/0071626 A1 | 4/2004 | Smith et al. |
| 2004/0081609 A1 | 4/2004 | Green et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0213728 A1 | 10/2004 | Kopietz et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0063893 A1 | 3/2005 | Ayala et al. |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0228290 A1 | 10/2006 | Green |
| 2006/0239890 A1 | 10/2006 | Chang et al. |
| 2007/0010606 A1 | 1/2007 | Hergenrother et al. |
| 2007/0104636 A1 | 5/2007 | Kutsovsky et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0263954 A1 | 10/2008 | Hammel et al. |
| 2008/0279749 A1 | 11/2008 | Probst et al. |
| 2008/0286574 A1 | 11/2008 | Hamby et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0151844 A1 | 6/2009 | Miyazaki |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0055017 A1 | 3/2010 | Vanier et al. |
| 2010/0147188 A1 | 6/2010 | Mamak et al. |
| 2010/0249353 A1 | 9/2010 | Macintosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0089115 A1 | 4/2011 | Lu |
| 2011/0120137 A1 | 5/2011 | Ennis |
| 2011/0138766 A1 | 6/2011 | Elkady et al. |
| 2011/0150756 A1 | 6/2011 | Adams et al. |
| 2011/0155703 A1 | 6/2011 | Winn |
| 2011/0174407 A1 | 7/2011 | Lundberg et al. |
| 2011/0180513 A1 | 7/2011 | Luhrs et al. |
| 2011/0214425 A1 | 9/2011 | Lang et al. |
| 2011/0217229 A1 | 9/2011 | Inomata et al. |
| 2011/0236816 A1 | 9/2011 | Stanyschofsky et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0092598 A1 | 4/2012 | Kyrlidis et al. |
| 2012/0177531 A1 | 7/2012 | Chuang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0126485 A1 | 5/2013 | Foret |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0013996 A1 | 1/2014 | Dikan et al. |
| 2014/0027411 A1 | 1/2014 | Voronin et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Baker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0296413 A1 | 10/2014 | Miyazaki et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044105 A1 | 2/2015 | Novoselov |
| 2015/0044516 A1 | 2/2015 | Kyrlidis et al. |
| 2015/0056127 A1 | 2/2015 | Chavan et al. |
| 2015/0056516 A1 | 2/2015 | Hellring et al. |
| 2015/0064099 A1 | 3/2015 | Nester et al. |
| 2015/0087764 A1 | 3/2015 | Sanchez Garcia et al. |
| 2015/0180346 A1 | 6/2015 | Yuzurihara et al. |
| 2015/0183962 A1 | 7/2015 | Belmont et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2015/0259211 A9 | 9/2015 | Hung et al. |
| 2015/0307351 A1 | 10/2015 | Mabrouk et al. |
| 2016/0030856 A1 | 2/2016 | Kaplan et al. |
| 2016/0152469 A1 | 6/2016 | Chakravarti et al. |

(56) References Cited

U.S. PATENT DOCUMENTS

| | | | |
|---|---|---|---|
| 2016/0210856 A1 | 7/2016 | Assenbaum et al. | |
| 2016/0243518 A1 | 8/2016 | Spitzl | |
| 2016/0293959 A1 | 10/2016 | Blizanac et al. | |
| 2016/0296905 A1 | 10/2016 | Kuhl | |
| 2016/0319110 A1 | 11/2016 | Matheu et al. | |
| 2017/0034898 A1 | 2/2017 | Moss et al. | |
| 2017/0037253 A1 | 2/2017 | Hardman et al. | |
| 2017/0058128 A1 | 3/2017 | Johnson et al. | |
| 2017/0066923 A1 | 3/2017 | Hardman et al. | |
| 2017/0073522 A1 | 3/2017 | Hardman et al. | |
| 2017/0117538 A1 | 4/2017 | Bendimerad et al. | |
| 2017/0349758 A1 | 12/2017 | Johnson et al. | |
| 2018/0015438 A1 | 1/2018 | Taylor et al. | |
| 2018/0016441 A1 | 1/2018 | Taylor et al. | |
| 2018/0022925 A1 | 1/2018 | Hardman et al. | |
| 2018/0148506 A1 | 5/2018 | Png et al. | |
| 2018/0340074 A1 | 11/2018 | Wittmann et al. | |
| 2018/0366734 A1 | 12/2018 | Korchev et al. | |
| 2019/0040225 A1 | 2/2019 | Tassinari et al. | |
| 2019/0048200 A1 | 2/2019 | Johnson et al. | |
| 2019/0100658 A1 | 4/2019 | Taylor et al. | |
| 2019/0153234 A1 | 5/2019 | Hoermann et al. | |
| 2019/0232718 A1 | 8/2019 | Halasa et al. | |
| 2019/0338139 A1 | 11/2019 | Hoermann et al. | |
| 2020/0140691 A1 | 5/2020 | Johnson et al. | |
| 2020/0239697 A1 | 7/2020 | Wittmann et al. | |
| 2020/0291237 A1 | 9/2020 | Hardman et al. | |
| 2021/0017025 A1 | 1/2021 | Hardman | |
| 2021/0017031 A1 | 1/2021 | Hardman et al. | |
| 2021/0020947 A1 | 1/2021 | Hardman et al. | |
| 2021/0071007 A1 | 3/2021 | Hardman et al. | |
| 2021/0120658 A1 | 4/2021 | Moss et al. | |
| 2021/0261417 A1 | 8/2021 | Cardinal et al. | |
| 2022/0272826 A1 | 8/2022 | Hoermann et al. | |
| 2022/0274046 A1 | 9/2022 | Johnson et al. | |
| 2022/0339595 A1 | 10/2022 | Taylor et al. | |
| 2023/0136364 A1 | 5/2023 | Johnson et al. | |
| 2023/0154640 A1 | 5/2023 | Hardman et al. | |
| 2023/0212401 A1 | 7/2023 | Hardman et al. | |
| 2023/0257260 A1 | 8/2023 | Kacem et al. | |
| 2023/0279234 A1 | 9/2023 | Hoermann et al. | |
| 2023/0279235 A1 | 9/2023 | Taylor et al. | |
| 2023/0354501 A1 | 11/2023 | Moss et al. | |
| 2023/0357021 A1 | 11/2023 | Hanson et al. | |
| 2024/0093035 A1 | 3/2024 | Hardman et al. | |
| 2024/0343909 A1 | 10/2024 | Johnson et al. | |
| 2024/0409720 A1 | 12/2024 | Hardman et al. | |

FOREIGN PATENT DOCUMENTS

| | | | |
|---|---|---|---|
| CA | 830378 A | 12/1969 | |
| CA | 964405 A | 3/1975 | |
| CA | 2353752 A1 | 1/2003 | |
| CA | 2621749 A1 | 8/2009 | |
| CA | 3060482 A1 | 11/2017 | |
| CN | 85201622 U | 7/1986 | |
| CN | 86104761 A | 2/1987 | |
| CN | 85109166 A | 4/1987 | |
| CN | 1059541 A | 3/1992 | |
| CN | 1076206 A | 9/1993 | |
| CN | 1077329 A | 10/1993 | |
| CN | 1078727 A | 11/1993 | |
| CN | 1082571 A | 2/1994 | |
| CN | 1086527 A | 5/1994 | |
| CN | 1196032 A | 10/1998 | |
| CN | 1398780 A | 2/2003 | |
| CN | 1458966 A | 11/2003 | |
| CN | 1491740 A | 4/2004 | |
| CN | 1644650 A | 7/2005 | |
| CN | 1656632 A | 8/2005 | |
| CN | 1825531 A | 8/2006 | |
| CN | 1833313 A | 9/2006 | |
| CN | 101092691 A | 12/2007 | |
| CN | 101143296 A | 3/2008 | |
| CN | 101193817 A | 6/2008 | |
| CN | 101198442 A | 6/2008 | |
| CN | 201087175 Y | 7/2008 | |
| CN | 201143494 Y | 11/2008 | |
| CN | 101335343 A | 12/2008 | |
| CN | 101368010 A | 2/2009 | |
| CN | 101529606 A | 9/2009 | |
| CN | 101534930 A | 9/2009 | |
| CN | 101657283 A | 2/2010 | |
| CN | 101734620 A | 6/2010 | |
| CN | 101946080 A | 1/2011 | |
| CN | 101958221 A | 1/2011 | |
| CN | 102007186 A | 4/2011 | |
| CN | 102060281 A | 5/2011 | |
| CN | 102108216 A | 6/2011 | |
| CN | 102186767 A | 9/2011 | |
| CN | 102350506 A | 2/2012 | |
| CN | 102612549 A | 7/2012 | |
| CN | 102666686 A | 9/2012 | |
| CN | 102702801 A | 10/2012 | |
| CN | 202610344 U | 12/2012 | |
| CN | 102869730 A | 1/2013 | |
| CN | 102993788 A | 3/2013 | |
| CN | 103108831 A | 5/2013 | |
| CN | 103160149 A | 6/2013 | |
| CN | 103391678 A | 11/2013 | |
| CN | 203269847 U | 11/2013 | |
| CN | 203415580 U | 1/2014 | |
| CN | 204301483 U | 4/2015 | |
| CN | 104798228 A | 7/2015 | |
| CN | 105070518 A | 11/2015 | |
| CN | 105073906 A | 11/2015 | |
| CN | 105308775 A | 2/2016 | |
| CN | 205472672 U | 8/2016 | |
| CN | 107709474 A | 2/2018 | |
| DE | 211457 A3 | 7/1984 | |
| DE | 19807224 A1 | 8/1999 | |
| EA | 200300389 A1 | 12/2003 | |
| EP | 0315442 A2 | 5/1989 | |
| EP | 0325689 A1 | 8/1989 | |
| EP | 0616600 A1 | 9/1994 | |
| EP | 0635044 B1 | 2/1996 | |
| EP | 0635043 B1 | 6/1996 | |
| EP | 0861300 A1 | 9/1998 | |
| EP | 0982378 A1 | 3/2000 | |
| EP | 1017622 A1 | 7/2000 | |
| EP | 1088854 A2 | 4/2001 | |
| EP | 1188801 A1 | 3/2002 | |
| EP | 3099397 A1 | 12/2016 | |
| EP | 3100597 A2 | 12/2016 | |
| EP | 3253826 A1 | 12/2017 | |
| EP | 3253827 A1 | 12/2017 | |
| EP | 3253904 A1 | 12/2017 | |
| EP | 3331821 A1 | 6/2018 | |
| EP | 3347306 A1 | 7/2018 | |
| EP | 3350855 A1 | 7/2018 | |
| EP | 3448553 A1 | 3/2019 | |
| EP | 3448936 A1 | 3/2019 | |
| EP | 3592810 A1 | 1/2020 | |
| EP | 3612600 A1 | 2/2020 | |
| EP | 3676220 A1 | 7/2020 | |
| EP | 3676335 A1 | 7/2020 | |
| EP | 3676901 A1 | 7/2020 | |
| EP | 3700980 A1 | 9/2020 | |
| EP | 3774020 A1 | 2/2021 | |
| EP | 4225698 A1 | 8/2023 | |
| FR | 1249094 A | 12/1960 | |
| FR | 2891434 A1 | 3/2007 | |
| FR | 2937029 A1 | 4/2010 | |
| FR | 3112767 B1 | 5/2023 | |
| GB | 395893 A | 7/1933 | |
| GB | 987498 A | 3/1965 | |
| GB | 1068519 | 5/1967 | |
| GB | 1068519 | 5/1967 | |
| GB | 1291487 A | 10/1972 | |
| GB | 1400266 A | 7/1975 | |
| GB | 1492346 A | 11/1977 | |
| GB | 2419883 A | 5/2006 | |
| JP | S5021983 B1 | 7/1975 | |
| JP | S5987800 A | 5/1984 | |

(56) References Cited

FOREIGN PATENT DOCUMENTS

| | | |
|---|---|---|
| JP | S6411074 A | 1/1989 |
| JP | H04228270 A | 8/1992 |
| JP | H05226096 A | 9/1993 |
| JP | H06302527 A | 10/1994 |
| JP | H06322615 A | 11/1994 |
| JP | H07500695 A | 1/1995 |
| JP | H07307165 A | 11/1995 |
| JP | H08176463 A | 7/1996 |
| JP | H08319552 A | 12/1996 |
| JP | H09316645 A | 12/1997 |
| JP | H11123562 A | 5/1999 |
| JP | 2001085014 A | 3/2001 |
| JP | 2001164053 A | 6/2001 |
| JP | 2001253974 A | 9/2001 |
| JP | 2002121422 A | 4/2002 |
| JP | 2002203551 A | 7/2002 |
| JP | 2004300334 A | 10/2004 |
| JP | 3636623 B2 | 4/2005 |
| JP | 2005235709 A | 9/2005 |
| JP | 2005243410 A | 9/2005 |
| JP | 2007505975 A | 3/2007 |
| JP | 2010525142 A | 7/2010 |
| JP | 2012505939 A | 3/2012 |
| JP | 5226096 B2 | 7/2013 |
| JP | 2016526257 A | 9/2016 |
| KR | 19980703132 A | 10/1998 |
| KR | 20030046455 A | 6/2003 |
| KR | 20050053595 A | 6/2005 |
| KR | 20080105344 A | 12/2008 |
| KR | 20140022263 A | 2/2014 |
| KR | 20140075261 A | 6/2014 |
| KR | 20150121142 A | 10/2015 |
| KR | 20170031061 A | 3/2017 |
| RU | 2425795 C2 | 8/2011 |
| RU | 2488984 C2 | 7/2013 |
| TW | 200418933 A | 10/2004 |
| WO | WO-9004852 A1 | 5/1990 |
| WO | WO-9204415 A1 | 3/1992 |
| WO | WO-9312030 A1 | 6/1993 |
| WO | WO-9312031 A1 | 6/1993 |
| WO | WO-9312633 A1 | 6/1993 |
| WO | WO-9318094 A1 | 9/1993 |
| WO | WO-9320152 A1 | 10/1993 |
| WO | WO-9320153 A1 | 10/1993 |
| WO | WO-9323331 A1 | 11/1993 |
| WO | WO-9408747 A1 | 4/1994 |
| WO | WO-9618688 A1 | 6/1996 |
| WO | WO-9629710 A1 | 9/1996 |
| WO | WO-9703133 A1 | 1/1997 |
| WO | WO-9813428 A1 | 4/1998 |
| WO | WO-0018682 A1 | 4/2000 |
| WO | WO-0192151 A1 | 12/2001 |
| WO | WO-0224819 A1 | 3/2002 |
| WO | WO-03014018 A1 | 2/2003 |
| WO | WO-2004083119 A1 | 9/2004 |
| WO | WO-2005054378 A1 | 6/2005 |
| WO | WO-2007016418 A2 | 2/2007 |
| WO | WO-2009143576 A1 | 12/2009 |
| WO | WO-2010040840 A2 | 4/2010 |
| WO | WO-2010059225 A1 | 5/2010 |
| WO | WO-2012015313 A1 | 2/2012 |
| WO | WO-2012067546 A2 | 5/2012 |
| WO | WO-2012094743 A1 | 7/2012 |
| WO | WO-2012149170 A1 | 11/2012 |
| WO | WO-2013134093 A1 | 9/2013 |
| WO | WO-2013184074 A1 | 12/2013 |
| WO | WO-2013185219 A1 | 12/2013 |
| WO | WO-2014000108 A1 | 1/2014 |
| WO | WO-2014012169 A1 | 1/2014 |
| WO | WO-2014149455 A1 | 9/2014 |
| WO | WO-2015049008 A1 | 4/2015 |
| WO | WO-2015051893 A1 | 4/2015 |
| WO | WO-2015051898 A1 | 4/2015 |
| WO | WO-2015093947 A1 | 6/2015 |
| WO | WO-2015116797 A1 | 8/2015 |
| WO | WO-2015116798 A1 | 8/2015 |
| WO | WO-2015116800 A1 | 8/2015 |
| WO | WO-2015116807 A1 | 8/2015 |
| WO | WO-2015116811 A1 | 8/2015 |
| WO | WO-2015116943 A2 | 8/2015 |
| WO | WO-2015129683 A1 | 9/2015 |
| WO | WO-2016012367 A1 | 1/2016 |
| WO | WO-2016014641 A1 | 1/2016 |
| WO | WO-2016126598 A1 | 8/2016 |
| WO | WO-2016126599 A1 | 8/2016 |
| WO | WO-2016126600 A1 | 8/2016 |
| WO | WO-2017019683 A1 | 2/2017 |
| WO | WO-2017027385 A1 | 2/2017 |
| WO | WO-2017034980 A1 | 3/2017 |
| WO | WO-2017044594 A1 | 3/2017 |
| WO | WO-2017048621 A1 | 3/2017 |
| WO | WO-2017190015 A1 | 11/2017 |
| WO | WO-2017190045 A1 | 11/2017 |
| WO | WO-2018165483 A1 | 9/2018 |
| WO | WO-2018195460 A1 | 10/2018 |
| WO | WO-2019046320 A1 | 3/2019 |
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |
| WO | WO-2022076306 A1 | 4/2022 |
| WO | WO-2023059520 A1 | 4/2023 |
| WO | WO-2023137120 A1 | 7/2023 |
| WO | WO-2023235486 A1 | 12/2023 |
| WO | WO-2024086782 | 4/2024 |
| WO | WO-2024086831 | 4/2024 |
| WO | WO-2024254343 | 12/2024 |

OTHER PUBLICATIONS

Biscoe, et al., An X-ray study of carbon black. Journal of Applied physics, 1942; 13: 364-371.

Boehm, Some Aspects of Surface Chemistry of Carbon Blacks and Other Carbons. Carbon. 32.5. (1994): 759-769.

Breeze, Raising steam plant efficiency-Pushing the steam cycle boundaries.PEI Magazine 20.4 (2012) 1-12 .

Carmer, et al., Formation of silicon carbide particles behind shock waves. Appl. Phys. Lett. 54 (15), Apr. 10, 1989. 1430-1432.

Cataldo, The impact of a fullerene-like concept in carbon black science. Carbon 40 (2002): 157-162.

Chiesa, Paolo, et al., Using Hydrogen as Gas Turbine Fuel. Journal of Engineering for Gas Turbines and Power 127(1):73-80 (2005).

Cho, et al., Conversion of natural gas to hydrogen and carbon black by plasma and application of plasma black. Symposia-American Chemical Society, Div. Fuel Chem. 49.1. (2004): 181-183.

Chuang, S.H. et al. Hot flow analysis of swirling sudden-expansion dump combustor. Int. J. Numer. Meth. Fluids, 14: 217-239 (1992). https://doi.org/10.1002/fld.1650140208.

Co-pending U.S. Appl. No. 16/807,550, inventors Taylor; Roscoe W. et al., filed Mar. 3, 2020.

Co-pending U.S. Appl. No. 17/021,197, inventors Hardman; Ned J. et al., filed Sep. 15, 2020.

Co-pending U.S. Appl. No. 17/031,484, inventors Johnson; Peter L. et al., filed Sep. 24, 2020.

Co-pending U.S. Appl. No. 17/072,416, inventors Taylor; Roscoe W. et al., filed Oct. 16, 2020.

Co-pending U.S. Appl. No. 17/239,041, inventors Hardmanned; J. et al., filed Apr. 23, 2021.

Co-pending U.S. Appl. No. 17/245,296, inventors Johnsonpeter; L. et al., filed Apr. 30, 2021.

Co-pending U.S. Appl. No. 17/329,532, inventors Taylorroscoe; W. et al., filed May 25, 2021.

Co-pending U.S. Appl. No. 17/412,913, inventors Johnson; Peter L. et al., filed Aug. 26, 2021.

Co-pending U.S. Appl. No. 17/473,106, inventors Taylorroscoe; W. et al., filed Sep. 13, 2021.

Co-pending U.S. Appl. No. 17/487,982, inventors Hoermannalexander; F. et al., filed Sep. 28, 2021.

Co-pending U.S. Appl. No. 17/529,928, inventors Hardmanned; J. et al., filed Nov. 18, 2021.

(56) References Cited

OTHER PUBLICATIONS

Co-pending U.S. Appl. No. 17/741,161, inventors Hoermann; Alexander F. et al., filed May 10, 2022.
Co-pending U.S. Appl. No. 17/862,242, inventors Hardman; Ned J. et al., filed Jul. 11, 2022.
Co-pending U.S. Appl. No. 18/066,929, inventor Alexander; F. Hoermann, filed Dec. 15, 2022.
Co-pending U.S. Appl. No. 18/172,835, inventor Ned; J. Hardman, filed Feb. 22, 2023.
Co-pending U.S. Appl. No. 18/233,129, inventors Alexander; F. Hoermann et al., filed Aug. 11, 2023.
Co-pending U.S. Appl. No. 18/381,881, inventors Hardman; Ned J. et al., filed Oct. 19, 2023.
Co-pending U.S. Appl. No. 18/384,704, inventors Johnson; Peter L. et al., filed Oct. 27, 2023.
Co-pending U.S. Appl. No. 18/433,023, inventors Johnson; Peter L. et al., filed Feb. 5, 2024.
Co-pending U.S. Appl. No. 18/614,492, filed Mar. 22, 2024.
Co-pending U.S. Appl. No. 18/628,630, filed Apr. 5, 2024.
Co-pending U.S. Appl. No. 18/651,160, filed Apr. 30, 2024.
Co-pending U.S. Appl. No. 18/658,443, inventors Hoermann; Alexander F. et al., filed May 8, 2024.
Co-pending U.S. Appl. No. 18/673,119, filed May 23, 2024.
Co-pending U.S. Appl. No. 18/680,456, filed May 31, 2024.
Co-pending U.S. Appl. No. 18/770,339, inventors Dames; Enoch E. et al., filed Jul. 11, 2024.
Co-pending U.S. Appl. No. 18/778,707, inventors Ned; J. Hardman et al., filed Jul. 19, 2024.
Co-pending U.S. Appl. No. 18/963,352, inventors Dames; Enoch E. et al., filed Nov. 27, 2024.
Database WPI, Week 200323, 2017 Clarivate Analytics. Thomson Scientific, London, GB; Database accession No. 2003-239603, XP002781693.
Denka Black, available from Denki Kagaky Kogyo Kabushiki Kaisha, retrieved from the manufacturer's website on May 13, 2013.
Denka Black, available from Denki Kagaky Kogyo Kabushiki Kaisha, retrieved from the Wayback Machine archive of the manufacturer's website from Jul. 18, 2015.
Dick, J.S. Utilizing the RPA Variable Temperature Analysis for More Effective Tire Quality Assurance., conference paper/proceeding, International Tire Exhibition & Conference (ITEC), Akron, Ohio, Sep. 16-18, 2008: pp. 1-22.
Donnet, et al., Carbon Black. New York: Marcel Dekker, (1993): 46, 47 and 54.
Donnet, et al., Observation of Plasma-Treated Carbon Black Surfaces by Scanning Tunnelling Microscopy. Carbon (1994) 32(2): 199-206.
EP Application No. 21878297.7 Third Party Observation filed on Sep. 23, 2024.
EP15743214.7 Extended European Search Report dated Jan. 16, 2018.
EP15743214.7 Partial Supplementary European Search Report dated Sep. 12, 2017.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
EP18851605.8 Extended European Search Report dated Feb. 25, 2021.
EP18869902.9 Extended European Search Report dated Mar. 19, 2021.
EP19780959.3 Extended European Search Report dated Dec. 21, 2021.
Erman, et al., The Science and Technology of Rubber. Fourth Edition, Academic Press (2013).
Extended European Search Report for EP Application No. 15742910.1 dated Jul. 18, 2017.
Extended European Search Report for EP Application No. 15743214.7 dated Jan. 16, 2018.
Extended European Search Report for EP Application No. 16747055.8, dated Jun. 27, 2018.
Extended European Search Report for EP Application No. 16747056.6 dated Jun. 27, 2018.
Extended European Search Report for EP Application No. 16747057.4 dated Oct. 9, 2018.
Extended European Search Report for EP Application No. 16835697.0 dated Nov. 28, 2018.
Fabry, et al., Carbon black processing by thermal plasma. Analysis of the particle formation mechanism. Chemical Engineering Science 56.6 (2001): 2123-2132.
Frenklach, et al., Silicon carbide and the origin of interstellar carbon grains. Nature, vol. 339; May 18, 1989: 196-198.
Fulcheri, et al., From methane to hydrogen, carbon black and water. International journal of hydrogen energy 20.3 (1995): 197-202.
Fulcheri, et al., Plasma processing: a step towards the production of new grades of carbon black. Carbon 40.2 (2002): 169-176.
Gago, et al., Growth mechanisms and structure of fullerene-like carbon-based thin films: superelastic materials for tribological applications. Trends in Fullerene Research, Published by Nova Science Publishers, Inc. (2007): 1-46.
Garberg, et al., A transmission electron microscope and electron diffraction study of carbon nanodisks. Carbon 46.12 (2008): 1535-1543.
Gomez-Pozuelo, et al., Hydrogen production by catalytic methane decomposition over rice husk derived silica. Fuel, Dec. 15, 2021; 306: 121697.
Grivei, et al., A clean process for carbon nanoparticles and hydrogen production from plasma hydrocarbon cracking. Publishable Report, European Commission JOULE III Programme, Project No. JOE3-CT97-0057, circa (2000): 1-25.
Hernandez, et al. Comparison of carbon nanotubes and nanodisks as percolative fillers in electrically conductive composites. Scripta Materialia 58 (2008) 69-72.
Hiemenz, P.C. Principles of Colloid and Surface Chemistry, 3rd ed., rev. and expanded, pp. 70-78 (1997).
Hoyer, et al., Microelectromechanical strain and pressure sensors based on electric field aligned carbon cone and carbon black particles in a silicone elastomer matrix. Journal of Applied Physics 112.9 (2012): 094324.
International Search Report and Written Opinion for Application No. PCT/US2015/013482 dated Jun. 17, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report and Written Opinion for Application No. PCT/US2015/013794 dated Jun. 19, 2015.
International Search Report and Written Opinion for Application No. PCT/US2016/015939 dated Jun. 3, 2016.
International Search Report and Written Opinion for Application No. PCT/US2016/015942 dated Apr. 11, 2016.
International search Report and Written Opinion for Application No. PCT/US2016/044039 dated Oct. 6, 2016.
International Search Report and Written Opinion for Application No. PCT/US2016/045793 dated Oct. 18, 2016.
International Search Report and Written Opinion for Application No. PCT/US2016/047769 dated Dec. 30, 2016.

(56) References Cited

OTHER PUBLICATIONS

International Search Report and Written Opinion for Application No. PCT/US2016/050728 dated Nov. 18, 2016.
International search Report and Written Opinion for Application No. PCT/US2016/051261 dated Nov. 18, 2016.
International Search Report and Written Opinion for Application No. PCT/US2017/030139 dated Jul. 19, 2017.
International Search Report and Written Opinion for Application No. PCT/US2017/030179 dated Jul. 27, 2017.
International Search Report and Written Opinion for Application No. PCT/US2018/021627 dated May 31, 2018.
International Search Report and Written Opinion for Application No. PCT/US2018/028619 dated Aug. 9, 2018.
International Search Report and Written Opinion for Application No. PCT/US2018/048374 dated Nov. 21, 2018.
International Search Report and Written Opinion for Application No. PCT/US2018/048378 dated Dec. 20, 2018.
International Search Report and Written Opinion for Application No. PCT/US2018/048381 dated Dec. 14, 2018.
International Search Report and Written Opinion for Application No. PCT/US2024/32863 dated Oct. 9, 2024.
Knaapila, et al., Directed assembly of carbon nanocones into wires with an epoxy coating in thin films by a combination of electric field alignment and subsequent pyrolysis. Carbon 49.10 (2011): 3171-3178.
Kohlenstoff, 4., neubearbeitete und erweiterte Auflage, in Ullmanns Encyclopadie der technischen Chemie, p. 637 (1977).
KR Application No. 10-2023-7015313 Third Party Submission filed on Sep. 4, 2024.
Krishnan, et al., Graphitic cones and the nucleation of curved carbon surfaces. Nature 388.6641 (1997): 451-454.
Lahaye, J. et al., Morphology and Internal Structure of Soot and Carbon Blacks. In: Siegla, D.C., Smith, G.W. (eds) Particulate Carbon. Springer, Boston. (1981): 33-34.
Larouche, et al., Nitrogen Functionalization of Carbon Black in a Thermo-Convective Plasma Reactor. Plasma Chem Plasma Process (2011) 31: 635-647.
Lee, et al., Application of Thermal Plasma for Production of Hydrogen and Carbon Black from Direct Decomposition of Hydrocarbon, Appl. Chem. Eng., vol. 18, No. 1, Feb. 2007, pp. 84-89.
Long C. M., et al., "Carbon black vs. black carbon and other airborne materials containing elemental carbon: Physical and chemical distinctions", Environmental Pollution, 2013, 181, pp. 271-286. https://doi.org/10.1016/j.envpol.2013.06.009.
Medalia, et al., Tinting Strength of Carbon Black. Journal of Colloid and Interface Science 40.2. 1-21 (1972).
Naess, et al., Carbon nanocones: wall structure and morphology. Science and Technology of advanced materials (2009): 1-7.
Pawlyta, M. et al., Raman microspectroscopy characterization of carbon blacks: Spectral analysis and structural information, Carbon 84: 479-490 (2015).
PCT/US2015/013484 International Search Report and Written Opinion dated Apr. 22, 2015.
PCT/US2015/13487 International Search Report and Written Opinion dated Jun. 16, 2015.
PCT/US2015/13510 International Search Report and Written Opinion dated Apr. 22, 2015.
PCT/US2016/015941 International Search Report and Written Opinion dated Apr. 21, 2016.
PCT/US2018/028619 International Search Report and Written Opinion dated Aug. 9, 2018.
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
PCT/US2021/053371 International Search Report and Written Opinion dated Feb. 17, 2022.
PCT/US2022/045451 International Search Report and Wrtitten Opinion dated Feb. 17, 2023.
PCT/US2023/010695 International Search Report and Written Opinion dated Jun. 22, 2023.
PCT/US2023/024148 International Search Report and Written Opinion dated Sep. 27, 2023.
PCT/US2023/077402 International Search Report and Written Opinion dated Apr. 7, 2024.
PCT/US2023/077479 International Search Report and Written Opinion dated Apr. 15, 2024.
Polman, et al., Reduction of CO2 emissions by adding hydrogen to natural gas. IEA Green House Gas R&D programme (2003): 1-98.
Pristavita, et al. Carbon blacks produced by thermal plasma: the influence of the reactor geometry on the product morphology. Plasma Chemistry and Plasma Processing 30.2 (2010): 267-279.
Pristavita, et al., Carbon nanoparticle production by inductively coupled thermal plasmas: controlling the thermal history of particle nucleation. Plasma Chemistry and Plasma Processing 31.6 (2011): 851-866.
Pristavita, et al., Volatile Compounds Present in Carbon Blacks Produced by Thermal Plasmas. Plasma Chemistry and Plasma Processing 31.6 (2011): 839-850.
Reese, Resurgence in American manufacturing will be led by the rubber and tire industry. Rubber World. 255. (2017): 18-21 and 23.
Reynolds, Electrode Resistance: How Important is Surface Area. Oct. 10, 2016. p. 3 para[0001]; Figure 3; Retrieved from http://electrotishing.net/2016/10/10/electrode-resistance-how-important-is-surface-area/ on May 8, 2018.
Schmidt, H. 129Xe NMR spectroscopic studies on carbon and black graphite. Faculty of Natural Sciences of the University of Duisburg-Essen, (2003): 36 pages (German language document and machine translation in English).
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
Singh, M. et al., Effect of Fuel Composition on Carbon Black Formation Pathways, Appl. Sci. 12(2569): 1-16 (2022).
Structure, specifications and functions of various fillers [Data collection], Technical Information Institute, Aug. 29, 2008, pp. 34-38.
Sun, et al., Preparation of carbon black via arc discharge plasma enhanced by thermal pyrolysis. Diamond & Related Materials (2015), doi: 10.1016/j.diamond.2015.11.004, 47 pages.
Supplementary Partial European Search Report for EP Application No. 15743214.7 dated Sep. 12, 2017.
Toth, P., et al., Structure of carbon black continuously produced from biomass pyrolysis oil. Green Chem. (2018) vol. 20: 3981-3992.
Translation of Official Notification of RU Application No. 2016135213 dated Feb. 12, 2018.
Tsujikawa, et al., Analysis of a Gas Turbine and Steam Turbine Combined Cycle with Liquefied Hydrogen as Fuel. International Journal of Hydrogen Energy 7(6):499-505 (1982).
U.S. Appl. No. 16/657,386 Notice of Allowance dated May 20, 2022.
U.S. Appl. No. 14/591,541 Notice of Allowance dated Sep. 17, 2018.
U.S. Environmental Protection Agency, Guide to Industrial Assessments for Pollution Prevention and Energy Efficiency. EPA 625/R-99/003 (1999): 1-474 pages.
U.S. Appl. No. 15/229,608 Office Action dated Jan. 23, 2024.
U.S. Appl. No. 15/548,346 Notice of Allowance dated Jan. 18, 2024.
U.S. Appl. No. 15/548,346 Notice of Allowance dated Jan. 30, 2024.
U.S. Appl. No. 16/802,174 Office Action dated Feb. 12, 2024.
U.S. Appl. No. 16/802,190 Office Action dated Jan. 31, 2022.
U.S. Appl. No. 17/498,693 Office Action dated Jan. 9, 2024.
U.S. Appl. No. 17/669,183 Office Action dated Jan. 5, 2024.
U.S. Appl. No. 17/817,482 Office Action dated Dec. 7, 2023.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,476 Office Action dated Feb. 27, 2017.
U.S. Appl. No. 14/591,476 Office Action dated Jul. 11, 2016.

(56) References Cited

OTHER PUBLICATIONS

U.S. Appl. No. 14/591,476 Office Action dated Jun. 7, 2018.
U.S. Appl. No. 14/591,476 Office Action dated Mar. 16, 2016.
U.S. Appl. No. 14/591,476 Office Action dated Oct. 13, 2017.
U.S. Appl. No. 14/591,528 Office Action dated Apr. 5, 2017.
U.S. Appl. No. 14/591,528 Office Action dated Jan. 16, 2018.
U.S. Appl. No. 14/591,528 Office Action dated Jan. 17, 2019.
U.S. Appl. No. 14/591,528 Office Action dated Oct. 28, 2019.
U.S. Appl. No. 14/591,528 Office Action dated Sep. 11, 2020.
U.S. Appl. No. 14/591,541 Notice of Allowance dated Jun. 7, 2018.
U.S. Appl. No. 14/591,541 Office Action dated Feb. 22, 2017.
U.S. Appl. No. 14/591,541 Office Action dated Jul. 14, 2016.
U.S. Appl. No. 14/591,541 Office Action dated Mar. 16, 2016.
U.S. Appl. No. 14/591,541 Office Action dated Oct. 13, 2017.
U.S. Appl. No. 14/601,761 Corrected Notice of Allowance dated Feb. 9, 2018.
U.S. Appl. No. 14/601,761 Ex Parte Quayle Actionn dated May 19, 2017.
U.S. Appl. No. 14/601,761 Notice of Allowance dated Feb. 9, 2018.
U.S. Appl. No. 14/601,761 Notice of Allowance dated Jan. 18, 2018.
U.S. Appl. No. 14/601,761 Notice of Allowance dated Jun. 19, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/601,761 Office Action dated Apr. 14, 2016.
U.S. Appl. No. 14/601,761 Office Action dated Oct. 19, 2016.
U.S. Appl. No. 14/601,793 Notice of Allowance dated Oct. 7, 2016.
U.S. Appl. No. 14/601,793 Office Action dated Apr. 13, 2016.
U.S. Appl. No. 14/601,793 Office Action dated mailed Aug. 3, 2016.
U.S. Appl. No. 14/610,299 Notice of Allowance dated Dec. 13, 2021.
U.S. Appl. No. 14/610,299 Notice of Allowance dated Feb. 20, 2020.
U.S. Appl. No. 14/610,299 Notice of Allowance dated Mar. 1, 2022.
U.S. Appl. No. 14/610,299 Notice of Allowance dated Nov. 16, 2021.
U.S. Appl. No. 14/610,299 Office Action dated Feb. 1, 2017.
U.S. Appl. No. 14/610,299 Office Action dated Feb. 17, 2021.
U.S. Appl. No. 14/610,299 Office Action dated Jun. 9, 2020.
U.S. Appl. No. 14/610,299 Office Action dated Jun. 17, 2019.
U.S. Appl. No. 14/610,299 Office Action dated May 2, 2017.
U.S. Appl. No. 14/610,299 Office Action dated Sep. 25, 2018.
U.S. Appl. No. 15/221,088 Office Action dated Apr. 20, 2018.
U.S. Appl. No. 15/221,088 Office Action dated Dec. 23, 2016.
U.S. Appl. No. 15/221,088 Office Action dated Dec. 4, 2019.
U.S. Appl. No. 15/221,088 Office Action dated Mar. 7, 2019.
U.S. Appl. No. 15/221,088 Office Action dated Sep. 19, 2017.
U.S. Appl. No. 15/229,608 Office Action dated Apr. 4, 2022.
U.S. Appl. No. 15/229,608 Office Action dated Apr. 8, 2019.
U.S. Appl. No. 15/229,608 Office Action dated Feb. 1, 2021.
U.S. Appl. No. 15/229,608 Office Action dated Jun. 29, 2023.
U.S. Appl. No. 15/229,608 Office Action dated May 15, 2020.
U.S. Appl. No. 15/229,608 Office Action dated Nov. 28, 2022.
U.S. Appl. No. 15/229,608 Office Action dated Oct. 25, 2019.
U.S. Appl. No. 15/229,608 Restriction Requirement dated Jul. 30, 2018.
U.S. Appl. No. 15/241,771 Notice of Allowance dated Nov. 20, 2023.
U.S. Appl. No. 15/241,771 Office Action dated Dec. 16, 2022.
U.S. Appl. No. 15/241,771 Office Action dated Dec. 30, 2021.
U.S. Appl. No. 15/241,771 Office Action dated Jan. 18, 2023.
U.S. Appl. No. 15/241,771 Office Action dated Jul. 18, 2022.
U.S. Appl. No. 15/241,771 Office Action dated Jul. 6, 2018.
U.S. Appl. No. 15/241,771 Office Action dated Mar. 13, 2019.
U.S. Appl. No. 15/241,771 Office Action dated May 1, 2020.
U.S. Appl. No. 15/241,771 Office Action dated Nov. 15, 2017.
U.S. Appl. No. 15/241,771 Office Action dated Sep. 1, 2023.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/259,884 Office Action dated Jun. 18, 2021.
U.S. Appl. No. 15/259,884 Office Action dated Mar. 4, 2022.
U.S. Appl. No. 15/259,884 Office Action dated May 31, 2019.
U.S. Appl. No. 15/259,884 Office Action dated Oct. 11, 2018.
U.S. Appl. No. 15/262,539 Notice of Allowance dated Jul. 23, 2020.
U.S. Appl. No. 15/262,539 Notice of Allowance dated Jun. 18, 2020.
U.S. Appl. No. 15/262,539 Office Action dated Jun. 1, 2018.
U.S. Appl. No. 15/262,539 Office Action dated Jan. 4, 2019.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jul. 31, 2020.
U.S. Appl. No. 15/410,283 Office Action dated Jun. 7, 2018.
U.S. Appl. No. 15/410,283 Office Action dated Mar. 12, 2019.
U.S. Appl. No. 15/548,346 Office Action dated Jul. 16, 2021.
U.S. Appl. No. 15/548,346 Office Action dated Jun. 5, 2023.
U.S. Appl. No. 15/548,346 Office Action dated Mar. 14, 2019.
U.S. Appl. No. 15/548,346 Office Action dated Mar. 18, 2022.
U.S. Appl. No. 15/548,346 Office Action dated May 4, 2020.
U.S. Appl. No. 15/548,346 Office Action dated Oct. 22, 2019.
U.S. Appl. No. 15/548,346 Office Action dated Oct. 3, 2022.
U.S. Appl. No. 15/548,348 Notice of Allowance dated Dec. 12, 2019.
U.S. Appl. No. 15/548,352 Office Action dated Apr. 7, 2022.
U.S. Appl. No. 15/548,352 Office Action dated Aug. 11, 2020.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Oct. 10, 2018.
U.S. Appl. No. 15/548,352 Office Action dated Sep. 21, 2021.
U.S. Appl. No. 16/097,035 Notice of Allowance dated Jul. 7, 2022.
U.S. Appl. No. 16/097,035 Notice of Allowance dated Mar. 24, 2022.
U.S. Appl. No. 16/097,035 Office Action dated May 10, 2021.
U.S. Appl. No. 16/097,035 Office Action dated Oct. 30, 2020.
U.S. Appl. No. 16/097,039 Notice of Allowance dated Jun. 14, 2021.
U.S. Appl. No. 16/097,039 Office Action dated Nov. 18, 2020.
U.S. Appl. No. 16/159,144 Office Action dated Mar. 26, 2020.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/180,635 Notice of Allowance dated Nov. 18, 2021.
U.S. Appl. No. 16/180,635 Office Action dated Dec. 15, 2020.
U.S. Appl. No. 16/445,727 Notice of Allowance dated Feb. 2, 2023.
U.S. Appl. No. 16/445,727 Notice of Allowance dated Oct. 26, 2022.
U.S. Appl. No. 16/445,727 Office Action dated Apr. 15, 2022.
U.S. Appl. No. 16/445,727 Office Action dated Aug. 17, 2021.
U.S. Appl. No. 16/563,008 Notice of Allowance Dated Nov. 6, 2023.
U.S. Appl. No. 16/563,008 Office Action dated Dec. 13, 2021.
U.S. Appl. No. 16/563,008 Office Action dated Jul. 25, 2022.
U.S. Appl. No. 16/563,008 Office Action dated Mar. 16, 2023.
U.S. Appl. No. 16/657,386 Notice of Allowance dated Mar. 10, 2023.
U.S. Appl. No. 16/657,386 Office Action dated Nov. 12, 2021.
U.S. Appl. No. 16/657,386 Office Action dated Sep. 16, 2022.
U.S. Appl. No. 16/802,174 Office Action dated Aug. 31, 2022.
U.S. Appl. No. 16/802,174 Office Action dated Feb. 16, 2022.
U.S. Appl. No. 16/802,174 Office Action dated Oct. 4, 2023.
U.S. Appl. No. 16/802,190 Notice of Allowance dated Feb. 26, 2024.
U.S. Appl. No. 16/802,190 Notice of Allowance dated Mar. 12, 2024.
U.S. Appl. No. 16/802,190 Office Action dated Apr. 19, 2023.
U.S. Appl. No. 16/802,190 Office Action dated Nov. 17, 2023.
U.S. Appl. No. 16/802,190 Office Action dated Oct. 5, 2022.
U.S. Appl. No. 16/802,212 Office Action dated Jul. 17, 2023.
U.S. Appl. No. 16/802,212 Office Action dated Mar. 24, 2022.
U.S. Appl. No. 16/802,212 Office Action dated Mar. 25, 2024.

(56) References Cited

OTHER PUBLICATIONS

U.S. Appl. No. 16/802,212 Office Action dated Sep. 16, 2022.
U.S. Appl. No. 16/855,276 Notice of Allowance dated May 11, 2022.
U.S. Appl. No. 16/855,276 Office Action dated Apr. 5, 2021.
U.S. Appl. No. 16/855,276 Office Action dated Oct. 25, 2021.
U.S. Appl. No. 16/892,199 Notice of Allowance dated Jan. 23, 2023.
U.S. Appl. No. 16/892,199 Notice of Allowance dated Jan. 31, 2023.
U.S. Appl. No. 16/892,199 Notice of Allowance dated May 4, 2023.
U.S. Appl. No. 16/892,199 Office Action dated Jun. 27, 2022.
U.S. Appl. No. 17/062,075 Office Action dated Jun. 14, 2023.
U.S. Appl. No. 17/498,693 Office Action dated Apr. 3, 2023.
U.S. Appl. No. 17/565,864 Notice of Allowance dated Feb. 1, 2024.
U.S. Appl. No. 17/565,864 Office Action dated Aug. 15, 2023.
U.S. Appl. No. 17/669,183 Notice of Allowance dated Aug. 26, 2024.
U.S. Appl. No. 17/669,183 Office Action dated Aug. 23, 2023.
U.S. Appl. No. 17/817,482 Notice of Allowance dated Jul. 31, 2024.
U.S. Appl. No. 17/817,482 Office Action dated Mar. 29, 2023.
U.S. Appl. No. 17/819,075 Office Action dated Apr. 9, 2024.
U.S. Appl. No. 17/819,075 Office Action dated Oct. 5, 2023.
U.S. Appl. No. 17/819,075 Office Action dated Sep. 5, 2024.
U.S. Appl. No. 17/938,304 Office Action dated May 21, 2024.
U.S. Appl. No. 17/938,591 Notice of Allowance dated Feb. 9, 2024.
U.S. Appl. No. 17/938,591 Office Action dated Sep. 25, 2023.
U.S. Appl. No. 18/046,723 Notice of Allowance dated Apr. 12, 2023.
U.S. Appl. No. 18/046,723 Notice of Allowance dated Apr. 19, 2023.
U.S. Appl. No. 18/046,723 Notice of Allowance dated Aug. 7, 2023.
U.S. Appl. No. 18/046,723 Notice of Allowance dated Oct. 18, 2023.
U.S. Appl. No. 18/137,918 Notice of Allowance dated Dec. 2, 2024.
U.S. Appl. No. 18/137,918 Office Action dated Nov. 17, 2023.
U.S. Appl. No. 18/205,384 Third Party Submission filed on Sep. 24, 2024.
U.S. Appl. No. 18/778,707 Office Action dated Sep. 16, 2024.
Vanooij W. et al., Adhesion of Steel Tire Cord to Rubber, Rubber Chemistry and Technology 82: 315-339 (2009).
Verfondern, Nuclear Energy for Hydrogen Production. Schriften des Forschungzentrum Julich 58 (2007): 4 pages.
What is Carbon Black, Orion Engineered Carbons, pp. 1-48 (Year: 2015).
Wikipedia. File: Diagram of carbon black structure and texture creation.png. 1-3 (May 8, 2024). https://en.wikipedia.org/wiki/File:Diagram_of_carbon_black_structure_and_texture_creation.png.
Wikipedia, Heating Element. Oct. 14, 2016. p. 1 para[0001]. Retrieved from https://en.wikipedia.org/w/index.php?title=Heating_element&oldid=744277540 on May 9, 2018.
Wikipedia, Joule Heating. Jan. 15, 2017. p. 1 para[0002]. Retrieved from https://en.wikipedia.org/w/index . Dhp?title=Joule_heating&oldid=760136650 on May 9, 2018.
Wikipedia. Radiocarbon method. 1-17 (May 8, 2024). https://dewikipedia.org/wiki/Radiokarbonmethode. (German language document and machine translation in English).
Wissler ("Graphite and carbon powders for electrochemical applications", J Power Sources, 156 (2006) 142-150). (Year: 2006).
Zhang, H. et al., Rotating gliding arc assisted methane decomposition in nitrogen for hydrogen production, Intern. J. Hydrogen Energy, 2014, 39, pp. 12620-12635 (Jul. 11, 2014).

\* cited by examiner

CARBON BLACK GENERATING SYSTEM

CROSS-REFERENCE TO RELATED APPLICATIONS

This application is a continuation of U.S. application Ser. No. 15/548,346, filed Aug. 2, 2017, now U.S. Pat. No. 11,987,712, which is a National Stage Entry of International Application No. PCT/US2016/015941, filed Feb. 1, 2016, which application claims the benefit under 35 U.S.C. § 119 (e) of U.S. Provisional Application No. 62/111,346, filed Feb. 3, 2015, the disclosures of which are expressly incorporated herein in their entirety.

TECHNICAL FIELD

The field of art to which this invention generally pertains is methods and apparatus for making use of electrical energy to effect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. As in all manufacturing, there is a constant search for more efficient and effective ways to produce such products. Varying flow rates and other conditions of energy sources, varying flow rates and other conditions of raw materials, increasing speed of production, increasing yields, reducing manufacturing equipment wear characteristics, etc. have all been, and continue to be, part of this search over the years.

The systems described herein meet the challenges described above, and additionally attain more efficient and effective manufacturing process.

BRIEF SUMMARY

An enclosed particle generating reactor is described, including a plasma generating section containing one or more sets of plasma generating electrodes, connected to a reactor section containing hydrocarbon injectors, the interior dimension of the reactor section being reduced by at least 10% downstream from the plasma generating electrodes, and the hydrocarbon injectors being either at the point of maximum reactor size reduction or further downstream from the plasma generating electrodes.

Additional embodiments include: the reactor described above where the interior dimension of the reactor section is reduced by at least 20% downstream from the plasma generating electrodes; the reactor described above where the interior dimension of the reactor section is reduced by at least 30% downstream from the plasma generating electrodes; the reactor described above where the interior dimension of the reactor section is reduced by at least 40% downstream from the plasma generating electrodes; the reactor described above additionally containing one or more of a heat exchanger connected to the reactor, a filter connected to the heat exchanger, a degas apparatus connected to the filter, a pelletizer connected to the degas apparatus, a binder mixing tank connected to the pelletizer, and a dryer connected to the pelletizer. Optionally, a conveying process, a process filter, cyclone, classifier or hammer mill can be added, as a non-limiting example of other components.

A method of making carbon black particles in an enclosed particle generating reactor is also described, including generating a plasma comprising at least 60% by volume hydrogen with plasma generating electrodes in a reactor, reducing the interior dimension of the reactor by at least 10% downstream of the plasma generating electrodes, and injecting hydrocarbon either at the point of maximum reactor size reduction or further downstream from the plasma generating electrodes to form carbon black particles.

Additional embodiments include: the method described above where the interior dimension of the reactor section is reduced by at least 20% downstream from the plasma generating electrodes; the method described above where the interior dimension of the reactor section is reduced by at least 30% downstream from the plasma generating electrodes; the method described above where the interior dimension of the reactor section is reduced by at least 40% downstream from the plasma generating electrodes; the method described above where at least 50% of the heat generated by the plasma as measured in Joules is transferred to the hydrocarbon in 500 milliseconds or less; the method described above where the hydrocarbon is fed at a rate of greater than 200 kg/hr based on carbon particle product mass; the method described above where the yield of carbon black based on total hydrocarbon injected into the reactor is greater than 80% as measured by moles of product carbon vs. moles of reactant carbon; the method described above where the injected hydrocarbon is cracked such that at least 80% by molar content of the hydrogen originally chemically attached through covalent bonds to the hydrocarbon is now homoatomically bonded as diatomic hydrogen; the method described above where the hydrocarbon is subjected to at least about 1000° C. but no more than about 3500° C. in the reactor by the heat generated from the plasma; the method described above where the electrodes are consumed at a rate of production of more than about 70 tons of carbon black per cubic meter electrode; the method described above where the electrodes are concentrically arranged and the ratio of surface areas degradation of inner and outer electrode stays constant during plasma generation; the method described above additionally including the use of a rotating arc discharge created through the application of a magnetic field to the electrodes of about 20 millitesla to about 100 millitesla; the method described above where the capacity of the reactor is greater than 3 kilotons/year, the flow rate of the hydrogen is at least 500 Nm$^3$/hr (normal cubic meter/hour) and the flow rate of hydrocarbon is at least 675 Nm$^3$/hr the method described above where the hydrocarbon is methane, ethane, or propane or mixtures thereof; the method described above where the carbon black produced contains a high concentration of combustible gasses in its pores, which are subsequently removed by replacement with inert gas, thereby rendering the carbon black safe to process in downstream equipment.

Additional embodiments also include: the method described above where the concentration of combustible gasses is greater than 30% by volume on a dry basis; the method described above where the carbon black produced is discharged into an upward flowing stream of inert gas causing the combustible gasses contained in the pores to diffuse into the inert gas; the method described above where changes in absolute pressure are used to replace the combustible gasses with inert gas; the method described above where the combustible gasses are removed by changes in temperature; the method described above where the inert gas is nitrogen; the method described above where the inert gas is a noble gas; the method described above where the inert gas is steam; the method described above where the inert gas is carbon dioxide, the method described above where the inert gas is a mixture of two or more of the above mentioned gasses; the method described above where the plasma comprises greater than 70% by volume $H_2$ and includes at least one or more of the gasses of HCN, $CH_4$, $C_2H_4$, $C_2H_2$, CO, benzene, naphthalene, or anthracene, or other polyaromatic hydrocarbons at a level of at least 1 ppm; the method described above where the carbon black particles produced are produced in admixture with an effluent stream of hot gas which exits the reactor into contact with a heat exchanger that reduces the thermal energy of the effluent stream of gasses and carbon black by greater than 5000 kJ/kg of carbon black; the method described above where the carbon black particles produced are produced in an admixture of an effluent stream of hot gas which exits the reactor into contact with a heat exchanger, and is subsequently passed through a filter which allows more than 50% by volume of the gas to pass through, capturing substantially all of the carbon black particles on the filter; the method described above where at least about 98% by weight of the carbon black particles are captured on the filter; the method described above where the carbon black particles produced are produced in an admixture of an effluent stream of hot gas containing combustible gas which exits the reactor into contact with a heat exchanger, and is subsequently passed through a filter, capturing substantially all of the carbon black particles on the filter, and the gas subsequently passes through a degas apparatus where the amount of combustible gas is reduced to less than 10% by volume; the method described above where the combustible gas is hydrogen; the method described above where the carbon black particles produced are produced in an admixture of an effluent stream of hot gas containing combustible gas, which exits the reactor into contact with a heat exchanger, and the admixture subsequently passed through a filter, capturing substantially all of the carbon black particles on the filter, and the carbon black with residual gas subsequently passes through a degas apparatus where the amount of combustible gas is reduced to less than 10% by volume, and the carbon particles are subsequently mixed with water with a binder and then formed into pellets, followed by removal of the majority of the water in a dryer.

Carbon black particles made according to above process are also described, having a WSP of between about 0 and about 5 m/m$^2$, and containing less than about 0.4% by weight hydrogen, and less than about 0.5% by weight oxygen.

These, and additional embodiments, will be apparent from the following descriptions.

DETAILED DESCRIPTION

Figure 1:
FIG. 1 shows a schematic representation of embodiments of typical methods and apparatus described herein.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Carbon black throughout ancient history has been made via the lamp or thermal process. There are references to ancient Roman texts giving instruction on how carbon black was made over 2000 years ago. (Donnet, Bansal and Wang, *Carbon Black*, New York: Marcel Dekker, 1993 p. 54, for example). The mid-19$^{th}$ century saw the advent of the channel process that was utilized to prepare a darker black with more structure and more utility in paints, coatings, and as a filler in polymers. The early 1940's through to the 50's witnessed a new process come to the forefront. The furnace process where an oil is combusted in the presence of a controlled amount of oxygen, provided a darker black with higher structure that allowed for better performance in elastomer composites for tires. Within 30 years, less than 10% of the carbon black on the market would be made by the channel process. Today the channel process provides less than 2% of the carbon black to the market.

As the technology of the carbon black process moves forward, there are new process challenges to the incumbent furnace process. Plasma based synthesis of carbon black is on the forefront of technology avant-garde. The process is clean, emitting near zero local $CO_2$, and zero $SO_x$—compared to multiple tons of $CO_2$ for the furnace process, with tens of kilograms of $NO_x$ and $SO_x$ for every ton of carbon black produced. Although the plasma technique has been attempted many times throughout the last century, there have been no long term viable commercial production enterprises based on this process.

Plasma has been used for a variety of purposes over the last 100 years. It has been used to produce acetylene from hydrocarbons in the Huls-Hoechst Electric Arc process. Plasma process has and is currently used to weld, coat, and cut all kinds of materials (see U.S. Pat. No. 4,864,096, for example). It has also been used to treat waste in order to make useful gasses and char (see U.S. Pat. No. 8,443,741, for example). Several attempts have been made to utilize electric arc plasma processes to manufacture fine carbon particles (see U.S. Pat. No. 7,462,343, for example). It is clear that while the plasma process could be useful for the production of fine particles, without the proper controls and specific high quality engineering the final product will not be useful. For example, despite the numerous patents (the patents listed above, as well as U.S. Pat. Nos. 3,344,051; 2,951,143; 5,989,512; etc. and other patents listed below) related to the production of fine carbon particles with plasma technology, there are no commercial products that utilize plasma production technology in the mass manufacture of fine carbon particles.

The processes and systems described herein solve the problems inherent to this process in the past and allows for a more efficient, less polluting process to replace the incumbent furnace process, converting gaseous or liquid fuels to solid carbon.

The processes and systems described herein can be successfully used in plasma generators utilizing a gaseous or gaseous mixture (at least 50% by volume gaseous) where the gas is reactive and corrosive in the plasma state. Specifically the plasma gas is at least 50% by volume hydrogen. The hydrogen gas mixture is supplied directly into a zone in which an electric discharge produced by a DC or AC source is sustained.

In the past, plasma generator designs have not been able to meet the power, corrosion resistance, and continuous operation requirements to produce carbon black because of such things as the insufficient unit power of their basic components and the tendency of these components to decay when exposed to hydrogen plasma, resulting in lost reactor time, increased capital costs, and uneconomically produced carbon black, among other things.

Prototype plasma generators that produce particles are designed to operate continuously for several hundred hours, the unit power of one of these typical plasma generators being approximately 1 MW (megawatts). What is needed is a reactor that can operate continuously for several thousand hours in a corrosive environment at powers at or greater than 4 MW. The processes and systems described herein enable the continuous operation and production of high quality carbon black from the plasma process where others have failed.

Plasma beams for various industrial processes are normally produced by plasma generators comprising a discharge chamber and mutually insulated electrodes. An electric arc discharge is initiated in the discharge chamber between the electrodes, in the flow of a medium. The latter is heated in the discharge to the plasma state and flows out of the generator in the form of a plasma jet. The most widely used are plasma generators energized by a DC source: they are simplest in design, most efficient as far as conversion of electrical to thermal energy is concerned, and easiest to control.

Of all plasma generator components, electrodes, or rather their surfaces exposed to the electric arc, "arc-spots", are in the most intense heating environment. The thermal flux density in these areas may reach $10^5$ to $10^6$ W/cm$^2$ (watts per square centimeter) at current as great as several thousand amperes. All known metals melt and evaporate under such conditions. Therefore, destruction of the electrodes at their surface is the typical means of erosion. This erosion substantially cuts down the service life of a plasma generator. The electrode erosion is heaviest in plasma generators operating in the presence of chemically active elements such as hydrogen or oxygen.

Elongating the life of the electrodes is largely dependent on the ability to minimize the thermal effect of the electric arc on the electrodes, as well as adequate protection of the electrode surface against the erosive medium. This can partially be achieved by applying an electromagnetic field to reduce the effects of the arc spots by moving the arc spots rapidly over the electrode surface, whereby the mean thermal flux is reduced in density to the areas of contact between the electrodes and electric arc. Additionally, the magnetic field will push the plasma outside of the confines of the immediate space between the two electrodes. This means that the erosive medium (superheated $H_2$ and hydrogen radical) will be largely separated from the electrode itself. In one embodiment, the method includes the use of a rotating arc discharge created through the application of a magnetic field to the electrodes, of about 20 millitesla to about 100 millitesla, measured at the tip of the torch radially around the circumference of the torch but axial and at the annulus of the electrodes. A value of about 30-50 millitesla can be typically used.

Another effective way to control electrode erosion is through distribution of the current of the main arc discharge among several discharges, whereby the thermal effect on each one of the parallel-connected electrodes of the electrode assembly, for example the anode, is mitigated. See, for example, U.S. Pat. Nos. 2,951,143 and 3,344,051. For example, in U.S. Pat. No. 3,344,051, multiple water cooled copper cathodes are utilized to reduce the arc-spots that result in the decomposition of the particle generating plasma reactor. While this is an interesting design, the plasma electrodes are made from copper and graphite and the copper decomposes in a hydrogen plasma atmosphere quite rapidly at temperatures required to make high quality carbon black (>1200° C.).

Another method to employ plasma is with a plurality (e.g. 3 or more) of AC electrodes. Examples of an AC plasma system can be found in U.S. Pat. No. 7,452,514, for example. The AC system can utilize a plurality of electrodes that has the advantage of more efficient energy consumption as well as reduced heat load at the electrode surface. Another way to generate hydrogen at temperatures greater than 2800° C. is to use inductive heating via resistive graphite tubular channels.

Other attempts to make carbon black in the plasma process have included utilizing cold microwave plasma which does not get to a high enough temperature to produce quality carbon black (see, for example, PCT publication No. WO2013185219A1). Additionally, processes that pass the hydrocarbon feedstock directly into the plasma zone also fail to make high quality carbon black due to the exposure of the feedstock to extremely high temperatures (>3200° C.). See, for example, U.S. Pat. No. 8,486,364. See also Chinese patent application publication No. CN103160149A which calls for the use of plasma as an ultrahigh temperature combustion technology to move the furnace process to higher temperatures that might enable smaller primary particles.

Past efforts have failed to produce commercial quality carbon black via plasma processing due to such things as a lack of the correct materials of construction for hydrogen plasma corrosion resistance, improper injection of hydrocarbon into a zone that is either too cold or too hot, insufficient knowledge of the carbon black particle formation process, etc., etc., among other things. Additionally, many attempts have failed simply because the economics of producing carbon black from hydrocarbon, for example, without recirculating the as-produced hydrogen back into the reactor and utilizing this gas as the plasma gas, making this process much less attractive on a cost basis when compared to the incumbent furnace process. For this reason, and others, the manufacture of high quality carbon black through the utilization of hydrogen plasma has simply not been successfully accomplished in the past.

U.S. Pat. No. 5,989,512 mentioned above teaches the use of a device and method for producing carbon black and hydrogen via thermal decomposition using a plasma torch. The adjustable injection nozzles are designed to create a reaction zone in the center of the reactor. The use of a ring is also employed to attempt to keep the plasma portion separate from the reaction portion. However, if abrupt reactor geometry changes such as described in this patent are employed, the materials of construction will degrade rapidly causing reactor failure. Also, mixing of the hydrocarbon precursor must be effected very close to or at the throat of the reactor to gain full advantage of the venturi.

U.S. Pat. No. 7,452,514 describes a device and method for producing carbon black and hydrogen via thermal decomposition using a plasma torch, a plasma chamber, a venturi for preventing recirculation of feedstock into the plasma chamber, and a reaction chamber where feedstock is injected into the hot plasma gas. The plasma gas listed in all examples is nitrogen and there are no enabling features within this patent that would provide for hydrogen plasma, which is clearly a very different environment. The reactor described in the patent would not make carbon black with hydrogen as the plasma gas. Due to the extremely low density of hydrogen, mixing the two effluent streams (hydrogen plasma and hydrocarbon) in the manner described in the patent would result in the hydrogen deflecting off of the methane stream with very little heat transfer to the methane. The reactor described in this patent would not make carbon black from methane, pyrolysis fuel oil or any other hydrocarbon feedstock with hydrogen as plasma gas. The reactor does not enable the use of plasma to make carbon black specifically from a hydrogen gas plasma source. Therefore, the patent itself does not enable one to use the most economically viable plasma gas, even though it discloses the use of hydrogen. The nitrogen plasma is not economically viable and cannot challenge the incumbent oil based furnace process; the plasma must be comprised of a majority of hydrogen to compete on an economic basis.

As described, for example, in US Published Patent Application No. 2005/0230240A1, the electrodes used to generate the plasma can become part of the product nanoparticle, where the graphite electrodes actually become fullerene nanoparticles in the process. This is not economical for the manufacture of carbon black and the methods and systems described herein specifically limit the decomposition of the graphite electrodes used to produce the hydrogen plasma.

As described, for example, in Published Patent Application No. GB1400266, it is very difficult to prepare many grades of carbon black from gaseous feedstock. The process in this document relates to a method to enable the feed of liquid precursors utilizing a methane plasma. This method, however, exposes the hydrocarbon feedstock to extremely high temperatures (>3000° C.) and can cause the manufacture of poor quality carbon black. Additionally, there are no cost savings over the furnace process because liquid fuel precursor is still required for the manufacture of carbon black. Furthermore, the conversion of the hydrocarbon feedstocks in these examples is below 90% further demonstrating this as a non-economical process.

As described in U.S. Pat. No. 8,771,386, for example, syngas is generated in a plasma from hydrocarbon feedstock. As is typical for this type of process, carbon black or soot formation is specifically avoided due to the normal uselessness of the carbon black when made from plasma. The high temperatures needed to produce quality carbon black in a hydrogen atmosphere result in erosion of the electrodes, throat, and reactor. This is one reason why the process described in U.S. Pat. No. 8,771,386 specifically attempts to avoid the synthesis of carbon black, even though the production of high quality carbon black would be significantly more valuable than syngas.

An enclosed process as defined herein includes a combination of a minimum of the plasma generator, the reaction chamber, the throat, the main filter, and the degas chamber. These components are substantially free of oxygen and other atmospheric gasses. The process is engineered to allow only the specific atmosphere that is preferred for the methods and systems described herein. Specifically, oxygen is either excluded or dosed at a controlled amount of less than 5% by volume in the enclosed process. The process is defined such that it includes one or more of the plasma generator, plasma chamber, throat, furnace, heat exchanger, main filter, degas chamber, and backend. The backend can optionally include one or more of a heat exchanger connected to the reactor, a filter connected to the heat exchanger, a degas (product inerting) apparatus connected to the filter, a pelletizer, connected to the degas apparatus, a binder mixing tank (typically binder and water) connected to the pelletizer, and a dryer connected to the pelletizer. These components are shown schematically in FIG. 1. These are typically conventional pieces of equipment used in the carbon black industry, as demonstrated, for example, by the patents cited herein. See also U.S. Pat. Nos. 3,981,659; 3,309,780; and 3,307,923.

Figure 2:
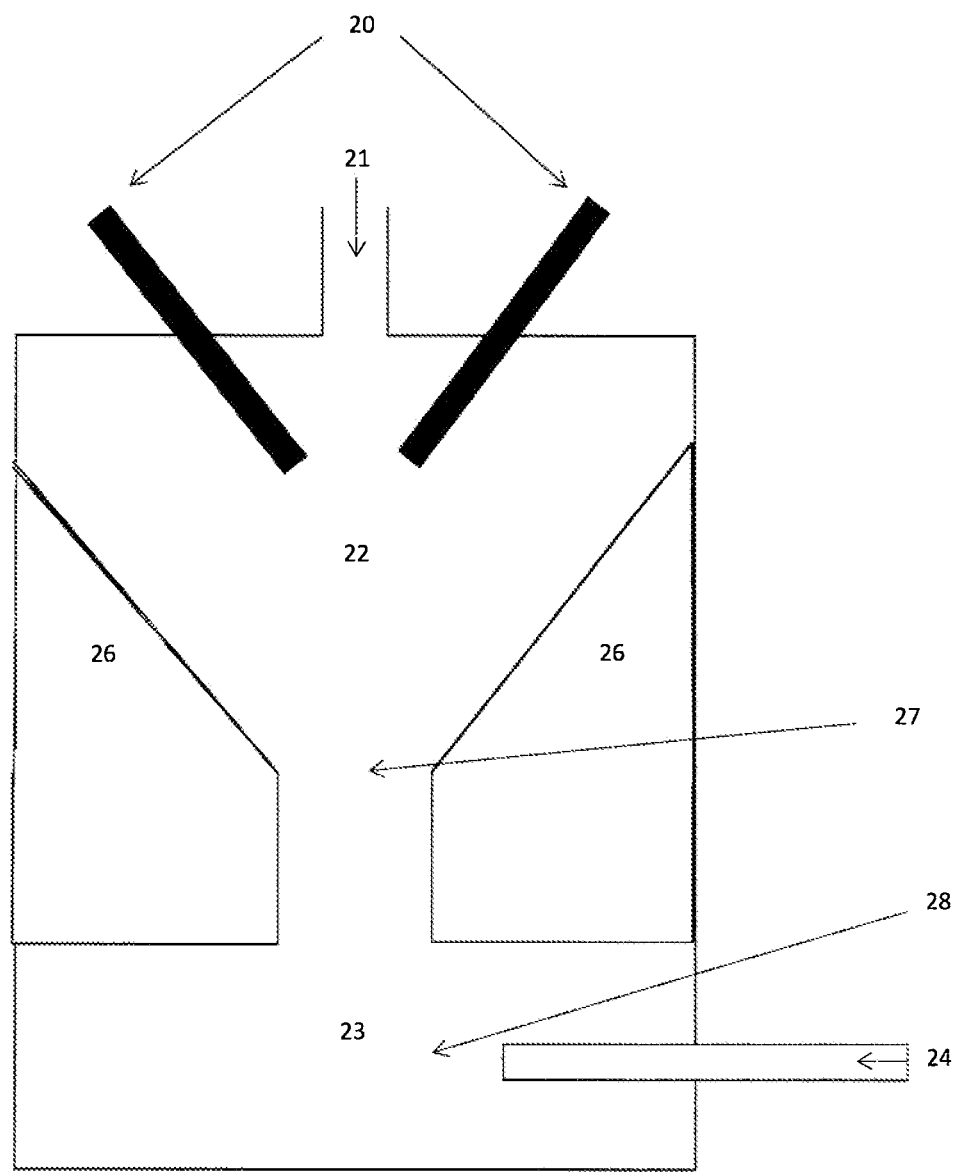
FIG. 2 shows a schematic representation of an embodiment of a typical apparatus described herein.

FIG. 2 shows a schematic representation of an embodiment of a typical apparatus described herein. Conventional plasma gas (21) such as oxygen, nitrogen, argon, helium, air, hydrogen, hydrocarbon (e.g. methane, ethane) etc. (used alone or in mixtures of two or more) injected into a plasma forming zone (22) containing conventional plasma forming electrodes (20) (which are typically made of copper, tungsten, graphite, molybdenum, silver etc.). The thus-formed plasma then enters into the reaction zone (23) where it reacts/interacts with a carbon containing feedstock (24) to generate a carbon black product. The liners (26) can be any conventionally used material which can withstand the plasma forming temperatures, with graphite being preferred. And the hydrocarbon injectors can be located anywhere on a plane between the point of maximum reactor size reduction (27) or further downstream (28) from the plasma generating electrodes. In an alternate embodiment, the hydrocarbon injector can be co-located with the plasma gas upstream of the plasma generation (21). The injector can be co-located but separated spatially from the flow of plasma gas, upstream of the plasma generation.

As used herein, homoatomically bonded means that the bond is between two atoms that are the same as in diatomic hydrogen or $H_2$. C—H is a heteroatomic bond. In one embodiment, the hydrocarbon goes from heteroatomic bonded C—H to homoatomically bonded H—H and C—C. The $H_2$ from the plasma is still present, but this is just referring to the $H_2$ from the $CH_4$ or other hydrocarbon feedstock.

It is challenging to generate a hot plasma gas economically. Cost of energy input can cause the economics of the process to appear to favor a furnace process that uses a natural gas burner to combust oil rather than an electric arc to create plasma which then cracks natural gas.

Control of final quality of carbon black is very dependent on process control and process optimization. The plasma process itself operates at temperatures in certain regions of the reactor that can be in excess of 3400° C. The temperature and mixing conditions have to be fully optimized and controlled to make all of the various grades of carbon black, of which there are several hundred. This attention to detail is difficult in the furnace process, but even more so in the plasma process where temperatures approach the temperature of the surface of the sun. Materials of construction, in addition to knowledge of the areas that must be cooled, must be enacted with knowledge of all of the other parts to effect the main purpose of the overall reactor, which is the efficient production of a plasma with maximal energy efficiency, utility of functional parts over maximal lifetime, minimal heat loss, maximal hydrogen recycling, maximal mixing and various combinations of the prior characteristics to effect full overall efficiency of the plasma reactor in total. In short, the reactor being a sum of all of the interchangeable parts working with maximum efficiency, combined with the complexity of the overall process, is quite unique from anything ever accomplished in this area in the past.

In many processes that make high quality carbon black, a venturi zone exists. For the production of high quality, high surface area carbon black with minimal coking, rapid mixing of feedstock with hot gas is required. High quality carbon black possesses tight distribution of surface area and DBP. For example the sample can be tuned to have particles that have a narrow particle size distribution and a narrow distribution of branched primary particles. This can be controlled by the time/temperature profile of the hydrocarbon feedstock during conversion to solid carbon black. Additionally, the amount of polyaromatic hydrocarbons (PAHs) is held to a minimal amount (less than 1% by mass). The amount of coke or grit is less than 500 ppm (parts per million) due to the rapid mixing and high temperatures of the plasma. And finally the surface chemistry is compatible with that which would be required for high performance in elastomer composites, for example, specifically as filler material in tread composites. The attention to these details has never been fully implemented in the pursuit of the manufacture of carbon black from the plasma process which is why there are currently no commercially sold carbon blacks that are made from the plasma process.

Dibutyl phthalate (DBP) absorption measures the relative structure of carbon black by determining the amount of DBP a given mass of carbon black can absorb before reaching a specified viscous paste. Thermal blacks have the lowest DBP numbers (32-47 ml/100 g) of any carbon black, indicating very little particle aggregation or structure. DBP is typically measured by following ASTM D2414-12.

The entire reaction to form fine particle carbon black is finished within several milliseconds after injection of hydrocarbon feedstock material. The arc of a plasma torch is incredibly hot, making it crucial to cool key components of the system. It's challenging to cool key components without having large inefficiencies. In some cases the heat fluxes are so high that it is impossible to prevent known materials of construction from failing using existing methods of cooling.

Downstream of the plasma generation the plasma chamber will narrow or converge to a conical or square/slot edge and then can optionally straighten before diverging into the reactor. Downstream of the narrowest point of the throat and toward the onset of the divergence into the reactor an injection point of hydrocarbon feedstock is affected. The throat can be described as a nozzle wherein the plasma gas is accelerated through the nozzle whose orifice is narrowing in the direction of the plasma gas. The plasma gas is guided into the reactor area where feedstock is injected such that under the prevailing conditions generated by aerodynamic and electromagnetic forces, intense rapid mixing between the plasma gas and feedstock occurs and there is no significant recirculation of feedstock into the plasma chamber, and the injection of hydrocarbon is controlled such that the area in space where reaction occurs does not come into contact with any surfaces. Substantially, more than 50% of the contained energy within the hydrogen is transferred to the hydrocarbon effluent stream within the first 500 milliseconds, given the start time at the point at which the hydrocarbon is injected and the heat can be transferred via radiative, conductive, thermal gas transfer or any other mechanism.

The desired amount of narrowing is determined through the interplay of 3 factors. The first factor is recirculation of hydrocarbons and solid carbon particles back into the plasma chamber. Narrowing the constriction or throat to a smaller diameter results in a higher velocity gas flow and thus less recirculation back into the plasma chamber. A 30% narrowing results in a doubling of the gas velocity. For the desired reduced recirculation, any area of increased downstream gas velocity will result in a decrease of recirculation back into the upstream region. Therefore, while 30% narrowing will double the velocity and provide for dramatic reduction in recirculation, even a 10% narrowing is beneficial for recirculation reduction.

Optimal mixing is obtained with maximum gas velocity at the throat, therefore, mixing will be improved with a more narrow throat.

The view factor is the ability of the plasma torch to radiate heat to the portion of the reactor beyond the throat and this is the third factor to consider when determining the diameter of the throat. The view factor is increased if the throat is less narrow. An increased view factor is preferable because it allows the forming particles to absorb more heat in the form of radiation from the plasma and also because it allows the walls of the reactor to reach maximum temperature. Because an increased view factor is desirable and maximal mixing with minimal recirculation is also desirable, there is a counterbalanced interplay amongst these factors. For these reasons, it is necessary to reduce the diameter of the process at the throat, however the reduction might be greater than 10%, or greater than 20%, or greater than 30%, or even greater than 40%. Different grades of carbon black can require a fine tuning of this parameter in order to target surface area, structure, surface chemistry properties, while at the same timing minimizing unreacted Polycyclic Aromatic Hydrocarbons (PAHs) and minimizing large particle contamination (grit) in the product.

Intermediate products of carbon black reactions have a tendency to stick to any surface they come into contact with. A great challenge for the plasma process is to prevent the intermediate product before carbon black formation to come into contact with any surface. This must be accomplished while maintaining the survival of interior components such as the plasma chamber liner, the throat material, the injector materials as well as the reactor itself. The challenge in the past and one of the major reasons that this has not been accomplished, is that controlling the mixing in a way that maintains the integrity of the reactor while also attaining the rapid mixing has eluded discovery in the past. The plasma process requires the mixing of relatively cold hydrocarbon of significant density with exceedingly hot hydrogen with very low density. Rapid mixing of these effluent streams has, to date, eluded discovery in the past.

Mixing of hydrocarbon feedstock at the throat or just downstream of the throat can be achieved through the use of multiple injectors that are tangentially oriented to the plasma flow. Preferably, the off-axis angle is about 5 degrees to about 85 degrees for reasons explained below.

Given four circular nozzles of a typical diameter for this type of reactor (total diameter of nozzles is typically less than 5% of the circumference of the cross-sectional plane where the injectors are co-located) the following modelling studies apply.

Fluid dynamics calculations have been performed to illustrate the difficulty of mixing cold hydrocarbon and hot hydrogen plasma effluent streams. One choice is to inject the hydrocarbon axially with the plasma flow. This results in excellent survivability of the reactor, but poor mixing of the two streams. There is very limited Kelvin-Helmholtz eddy based diffusion given axial injection. Another option is to inject radially. Due to the difference in density, speed, and temperature of the two effluent streams, the effect of radial mixing will be little to no mixing, inefficient use of the heat contained in the hydrogen and also degradation of the components at the reactor and downstream of the reactor. Substantially, the majority of the hydrocarbon feedstock will not be cracked by the hydrogen in both axial and radial mixing. In fact, even flow that is comprised of both axial and radial components (so called "off-axis" flow), while optimal for this nozzle configuration, will not result in a sufficient amount of cracked hydrocarbon so as to make this process competitive with furnace based carbon black.

If a plurality of nozzles, i.e. equal to or greater than 6 nozzles, or alternative shaped nozzles (e.g. slit shaped), the sum of the diameters of which comprise more than 5% of the circumference of the cross-sectional plane where the injectors are co-located are utilized, such that the majority of the hydrogen is trapped within a curtain of hydrocarbon feedstock, then maximal efficiency of heat transfer from hydrogen plasma to hydrocarbon feedstock can take place. As in the above example, insufficient mixing between the effluent streams will occur in the case of axial hydrocarbon injection. In the case of radial injection with the increased nozzle count/adjusted nozzle shape the mixing will be increased, however, the survivability of the components is much worse when compared to axial injection. With the optimized nozzle count/adjusted nozzle shape off-axis injection at a 5 degree to 85 degree off-axis angle, the survivability of components is maximized, mixing is maximized, and coking is minimized. Additionally, tangential flow can be introduced to further intensify mixing between the two effluent streams that have different densities, temperatures, velocities, as well as viscosity. Mixing these two streams is of tantamount importance and difficulty. Diameter in the above description is defined as the largest dimension of an irregular or regular shaped nozzle. For instance if the shape is a star the diameter is measured between the two tips of the star that give the largest internal dimension.

The reaction products are cooled after manufacture. A quench can be used that is comprised of a majority of hydrogen gas. This quench can be injected in the reactor portion of the process.

A heat exchanger can be used wherein the process gasses are exposed to a large amount of surface area and thus allowed to cool, while simultaneously the product stream is transported through the process. The heat exchanger in the reactor must be even more efficient in the plasma process than in the furnace process due to the elevated temperatures in the plasma process.

The heat exchanger is a shell and tube layout with a double bottom tube sheet. The amount of surface area is tied to the throughput, with 10 kW/m$^2$ (kilowatts per meter squared) as the limiting flux and 33 kW/m2/K as the heat transfer coefficient. Configuration is counter current with a portion of the air cooling the bottom tube sheet so that it can support the load of the tubes, combined with individual tube compensators (expansion bellows) so as to protect the heat exchanger should a tube block. Some designs also include a double shell that preheats the incoming air while cooling the bottom shell so that it has a higher creep strength. This also then reduces the temperature differential at the cold end of the heat exchanger, reducing fouling, fires and grit. Energy removed is dependent on operating conditions and grade. Possible improvements to this process can include a no fuel lean condition when the natural gas is shut off, so the fouling will not catch fire. This may relieve the need for the double bottom tube sheet, but such fires can be very damaging. The change in gas chemistry and density may also change the fouling process and degree. Current design is to remove around 20,000 kJ/kg (kilojoules/kilogram) of heat (black and gasses/vapours).

It is challenging to economically remove the hydrogen from the carbon black, particularly the small amount that remains in the pores and structure of the carbon black after it has been bulk separated in a cyclone, bag house, or other primary separation device.

A method of separating hydrogen and other combustible gasses from the pores of a carbon black agglomerate production stream formed in a plasma torch reactor system, or other system of making carbon black that results in the gasses made in forming the carbon black containing more than 40% combustible gasses, is described below. Such processes produce black that is typically filtered or otherwise separated from the bulk of the tail gas leaving the pores of the agglomerates full of combustible gasses, presenting a significant safety hazard to downstream atmospheric equipment. As described herein, such combustible gasses are removed from the pores of the black aggregates and so protect the downstream equipment that processes the black in air or air mixtures.

Additional embodiments include removing the combustible gasses from the pores of the black aggregates by varying the pressure or temperature, or discharging the carbon black produced into an upward flowing stream of inert gas causing the hydrogen contained in pores of the agglomerate to diffuse into the inert gas; the method described above where the inert gas used to vary the pressure or provide the upward flowing inert gas is nitrogen; the method described above where the inert gas used to vary the pressure or provide the upward flowing inert gas is a noble gas (helium, neon argon, krypton, xenon etc.).

The hydrogen entrapped within the pores of carbon black agglomerates produced in a typical plasma torch system and other high intensity carbon black processes, is recovered by counter current flow of nitrogen. Alternatively hydrogen removal can take place by pressure swing with nitrogen or another inert gas so that each change in pressure, from multiple atmospheres down to a lessor pressure or even a vacuum, so as to displace the combustible gasses with an inert gas. Other methods can include temperature swings or just leaving the product in filters overnight so that the hydrogen diffuses out over time.

Pressure swing degassing requires a pressure vessel to contain the change in pressure necessary for the use of a pressure swing. The same is true should the pressure swing use a vacuum instead of or supplemental to the pressure swing. While discontinuous, such pressure swings can take place over a short period of time and so result in inertion of the product in a relatively short period of time. Inertion refers to the removal of combustible gasses to a safe level where an explosion cannot take place, in other words creating an inert environment. Temperature swings would also effectively displace the pore combustible gasses, but would likely take longer than pressure swings or counter current methods. Removal of hydrogen overnight also takes too long for a continuous production process. Flowing gas through a mass of black, or through fluidized black (e.g. a fluid bed of black) could also remove combustible gasses, but does not represent a preferred method for removal due to the additional time required and the likelihood of channeling within the bed.

The counter current embodiment sets up an upward flowing inert gas that the black falls through. When discharging the black from the main unit filter it is sent into an upward flowing stream of inert gas. As the black falls down through the inert gas the hydrogen will diffuse out of the pores of the agglomerate into the inert gas. The buoyancy of the hydrogen and other combustible gasses will assist with this process. This embodiment should result in the least use of nitrogen, the highest concentration of combustible gasses in the evolved gas stream from this process and complete the process continuously.

The backend of the reactor can comprise a pelletizer, a dryer, a bagger as a non-limiting example of components. More components or fewer components can be added or removed. For instance, examples of a pelletizer can be found in US Published Patent Application No. 2012/0292794A1 (and references cited therein). For the pelletizer, water, binder and carbon black are typically added together in a pin type pelletizer, processed through the pelletizer, and then dried. The binder:carbon black ratio is less than about 0.1:1 and the water to carbon black ratio is typically within the range of about 0.1:1 to about 3:1. The black may also pass through classifiers, hammer mills or other size reduction equipment, so as to reduce the proportion of grit in the product.

Energy flow is about 3500 k/kg for a black requiring 1.2 kg water/kg carbon black (120 DBP). Lower DBP blacks would use less water to make acceptable quality pellets and so need less heat. A dryer should provide at least 155 kW to the materials being dried. The scale should be at least 200 kg/hour (equivalent to 2.5 kT/year (kilotons/year) or greater scale). Alternatively, the process could use the dry pelletisation process where a rotating drum densifies the product. For some uses, unpelletized black, so called fluffy black, or pelletized black that has been ground back to a fluffy state, may also be acceptable.

The dryer can be an indirect fired rotary dryer with co-current purge gas (direct gas addition to the dryer). The purpose is to dry the wet black without exposing it to the full oxygen content of the hot air. This exposure may result in a fire. So purge gas and hot air go in co-current. This limits the maximum temperature of the exterior of the black, which may otherwise get too hot while the interior is wet. A possible efficiency also exists where the pelletizing water can be heated so that the black goes in to the dryer at a higher temperature.

The carbon black is typically dried to about 250° C. so as to ensure the center is dry, but can be dried as low as about 150° C. to as high as about 400° C. The atmosphere in the dryer can be controlled as to effect oxidation at the surface of the carbon black or to maintain the pristine "dead" surface of the black. An example of an oxidizing atmosphere is one in which there is greater than about 5% by volume oxygen or greater than about 10% by volume oxygen. Also, for a small amount of oxidation the atmosphere can be controlled between about 1% to about 10% oxygen by volume. Furnace black can be further oxidized in this step, however, furnace black cannot be made to be more pristine in the dryer as the temperatures required to remove the native oxygen from the surface of carbon black are greater than 700° C. Plasma black as made is pristine and contains less than 0.2% by weight oxygen at the surface. Therefore, plasma black has added capability and tailorability when compared to furnace black.

Counter current operation would be more energy and capacity efficient. The addition of spent (as in cooler) air to the dryer barrel should also be limited so as to provide limited oxidation in a substantially steam atmosphere. Adding air to the barrel makes the dryer more thermally efficient and may also result in higher capacity. However, if dryer barrel velocity gets too high, it will sweep the pellets out of the dryer and so result in high recycle to the purge filter, and back to the pelletizer, reducing efficiency and capacity. It may also add too much oxygen to the surface of the black. Energy efficiency is of some importance as all the energy expended is less energy to raise steam/energy to use or sell. After giving up heat to the dryer the air will still contain a lot of energy, as it would be of the order of about 350° C. This gas could get directed to the boiler.

In addition to the improved process to make carbon black described herein, improved carbon black particles can also be produced. The particle can have a more ellipsoidal shape, such that the ellipsoid factor is greater than 1.3. The ellipsoidal factor is the length of the longest dimension of the ellipse divided by the width of the ellipse as defined by a line drawn at a 90 degree angle to the length. The ellipsoid factor for furnace black primary particles is typically between 1.0 and 1.3. The crystallinity can range from 1.0 to 4.0 in terms of $L_a$ or $L_c$. $L_a$ is the size of the crystalline domain in the ab plane of the graphite crystal as measured by powder diffraction x-ray crystallography. $L_c$ is the thickness of graphene sheets or the length of the c axis of the graphite domains within the carbon black primary particle. The hydrophilic content of the surface of the improved carbon black, for example as described by affinity to adsorb water from an 80% relative humidity atmosphere will be less than 0.05 to 0.5 mL (milliliter) of water for every m² (square meter) of carbon black surface area. Additionally, the hydrogen content is less than about 0.4%. The surface area, excluding pores that are internal to the primary particles, can be from about 10 m²/g (gram) up to about 300 m²/g and the DBP can from be about 32 mL/100 g to about 300 mL/100 g. These combinations of properties yield a unique material that is different from the incumbent furnace carbon black where surface acid groups dominate, resulting in higher water affinity. The nature of the hydrogen environment of the plasma process also means that there could be more hydrogen content at the surface. Higher hydrogen content has been indicated, for example, to be a benefit in tire tread abrasion resistance. Also, the lack of surface oxygen groups indicates that a faster mix time and faster cure time in elastomer composites should be achievable. Therefore, at a lower oxygen level at the surface of carbon black, the same amount of hydrogen could indicate greater surface activity for performance in tire tread and other elastomer filler applications.

The water spreading pressure (WSP) referred to below is also described, for example, in U.S. Pat. No. 8,501,148. Briefly, the mass increase is measured in a controlled atmosphere where the relative humidity (RH) is increased slowly over time. The increase is from 0 to 80% relative humidity and the WSP ($\pi^e$) is determined as the following equation:

$$\pi^e = RT/A \int_0^{P_O} H_2O(moles/g) d\ln P$$

Where R is the gas constant, T is the temperature, A is the N₂ surface area (SA)-(ASTM D6556) of the sample and H₂0 is the amount of water adsorbed to the carbon surface at the various RH's. P is the partial pressure of water in the atmosphere and Po is the saturation pressure and g is gram. The equilibrium adsorption is measured at various discrete RH's and then the area under the curve is measured to yield the WSP value. Samples are measured at 25° C. using a 3Flex system from Micromeritics. The region being integrated is from 0 to saturation pressure. The d has it's normal indication of integrating at whatever incremental unit is after the d, i.e., integrating at changing natural log of pressure.

Another method to obtain information as to the functionality at the surface is to perform titrations as documented by Boehm (Boehm, H P "Some Aspects of Surface Chemistry of Carbon Blacks and Other Carbons." *Carbon* 1994, page 759). WSP is a good parameter to measure general hydrophilicity of carbon black, however WSP does not provide for the ratio of functional groups at the surface as can be measured through typical Thermal Phase Desorption (TPD), X-Ray Photoelectron Spectroscopy (XPS), or via titration methods (Boehm titration). The WSP of the improved carbon black made in the plasma process will typically be between about 0 and about 8 mJ/m². This is lower than the typical range of furnace made carbon black of about 5 to about 20 mJ/m².

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   (a) an enclosed particle generating reactor, comprising a plasma generating section containing one or more sets of plasma generating electrodes, connected to a reactor section containing hydrocarbon injectors, an interior dimension of the reactor section being reduced by at least 10% downstream from the plasma generating electrodes, and the hydrocarbon injectors being either at the point of maximum reactor size reduction or further downstream from the plasma generating electrodes,
   (b) a degas apparatus coupled to the reactor, and
   (c) a pelletizer coupled to the degas apparatus.

2. The system of claim 1, wherein the interior dimension of the reactor section is reduced by at least 20% downstream from the plasma generating electrodes.

3. The system of claim 1, wherein the interior dimension of the reactor section is reduced by at least 30% downstream from the plasma generating electrodes.

4. The system of claim 1, wherein the interior dimension of the reactor section is reduced by at least 40% downstream from the plasma generating electrodes.

5. The system of claim 1, further comprising a heat exchanger connected to the reactor, a filter connected to the heat exchanger, the degas apparatus connected to the filter, a binder mixing tank connected to the pelletizer, and a dryer connected to the pelletizer.

6. An enclosed particle generating reactor, comprising:
   plasma generating electrodes in the reactor, wherein an interior dimension of the reactor is at least 10% smaller downstream of the plasma generating electrodes; and
   injectors configured to inject hydrocarbon either at a point where the interior dimension is smallest or further downstream from the plasma generating electrodes to form carbon black particles with combustible gas in pores therebetween,
   wherein a sum of diameters of the injectors is greater than 5% of a circumference of a cross-sectional plane of the reactor where the injectors are co-located.

7. The enclosed particle generating reactor of claim 6, further comprising an inert gas replacement system configured to replace a first amount of a combustible gas in pores between the carbon particles with an inert gas.

8. The enclosed particle generating reactor of claim 7, wherein the first amount of the combustible gas in pores between the carbon particles is at least 90% of a total amount of combustible gas in pores between the carbon particles.

9. The enclosed particle generating reactor of claim 7, wherein a concentration of the combustible gas in pores between the carbon particles is greater than 30% by volume on a dry basis.

10. The enclosed particle generating reactor of claim 7, wherein the combustible gas is hydrogen.

11. The enclosed particle generating reactor of claim 7, wherein the inert gas is one or more of a noble gas, nitrogen, steam, and/or carbon dioxide.

12. The enclosed particle generating reactor of claim 6, wherein the interior dimension of the reactor section is at least 20% smaller downstream from the plasma generating electrodes.

13. The enclosed particle generating reactor of claim 6, wherein the interior dimension of the reactor section is at least 30% smaller downstream from the plasma generating electrodes.

14. The enclosed particle generating reactor of claim 6, wherein the interior dimension of the reactor section is at least 40% smaller downstream from the plasma generating electrodes.

15. The enclosed particle generating reactor of claim 6, further comprising a magnetic field of about 20 millitesla to about 100 millitesla configured for application to the plasma generating electrodes to create a rotating arc discharge.

16. The enclosed particle generating reactor of claim 6, wherein the plasma generating electrodes are AC electrodes.

17. The enclosed particle generating reactor of claim 6, wherein the plasma generating electrodes are concentrically arranged.

18. The enclosed particle generating reactor of claim 6, wherein the reactor is configured to subject the hydrocarbon to a heat from a plasma generated from the plasma generating electrodes of at least about 1000° C. but no more than about 3500° C. in the reactor.

\* \* \* \* \*